(12) United States Patent
Waizenegger et al.

(10) Patent No.: US 11,170,202 B2
(45) Date of Patent: Nov. 9, 2021

(54) APPARATUS AND METHOD FOR PERFORMING 3D ESTIMATION BASED ON LOCALLY DETERMINED 3D INFORMATION HYPOTHESES

(71) Applicant: Fraunhofer-Gesellschaft zur Foerderung der angewandten Forschung e.V., Munich (DE)

(72) Inventors: Wolfgang Waizenegger, Berlin (DE); Oliver Schreer, Berlin (DE); Ingo Feldmann, Berlin (DE); Peter Eisert, Berlin (DE); Peter Kauff, Berlin (DE)

(73) Assignee: Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 63 days.

(21) Appl. No.: 16/206,698

(22) Filed: Nov. 30, 2018

(65) Prior Publication Data

US 2019/0095694 A1 Mar. 28, 2019

Related U.S. Application Data

(63) Continuation of application No. PCT/EP2017/063183, filed on May 31, 2017.

(30) Foreign Application Priority Data

Jun. 1, 2016 (EP) .................................. 16172527

(51) Int. Cl.
*G06K 9/00* (2006.01)
*G06T 7/55* (2017.01)
*G06T 7/536* (2017.01)

(52) U.S. Cl.
CPC .......... *G06K 9/00214* (2013.01); *G06T 7/536* (2017.01); *G06T 7/55* (2017.01);
(Continued)

(58) Field of Classification Search
CPC ............. G06K 9/00214; G06K 9/6202; G06K 9/00201; G06T 7/55; G06T 7/536;
(Continued)

(56) References Cited

U.S. PATENT DOCUMENTS 7,142,209 B2 * 11/2006 Uyttendaele ............. G09G 5/00
345/427
7,206,000 B2 * 4/2007 Zitnick, III ........... G06T 15/205
345/592

(Continued)

OTHER PUBLICATIONS

Stephen T. Barnard et al, "Computational Stereo", ACM Comput. Surv., vol. 14, No. 4, pp. 553-572, Dec. 1982.
(Continued)

*Primary Examiner* — Manav Seth
(74) *Attorney, Agent, or Firm* — Michael A. Glenn; Perkins Coie LLP

(57) ABSTRACT

An apparatus for performing 3D estimation on the basis of pictures of at least two different views includes a hypotheses provider, a similarity measure calculator, and a 3D information determiner. The hypotheses provider locally determines 3D information hypotheses for positions of a current picture of a first view on the basis of a pre-estimate which associates a 3D information estimate to each position of a picture of the first view. The similarity measure calculator calculates, for each position of the current picture of the first view, a hypotheses of the respective position by measuring a similarity between a region similarity measure for each of the 3D information of the current picture of the first view at the respective position and a corresponding region of a second view at a position displaced relative to the respective position by a respective 3D information hypothesis. The 3D information determiner selects, for each position of the first view, the 3D information hypothesis of highest similarity measure.

18 Claims, 14 Drawing Sheets

(52) U.S. Cl.
CPC .............................. *G06T 2200/04* (2013.01);
*G06T 2207/10004* (2013.01); *G06T 2207/10028* (2013.01)

(58) Field of Classification Search
CPC ....... G06T 2200/04; G06T 2207/10004; G06T 2207/10028; G06T 7/50; G06T 15/08; G06T 7/596; G06T 2207/10012; G06T 7/593; G06T 15/20; G06T 19/006; G06T 2207/10021; G06T 17/00; H04N 13/128; H04N 2013/0081; H04N 19/176; H04N 2213/003; H04N 19/159; H04N 19/167; H04N 5/2226; H04N 13/282; G06F 3/0346

See application file for complete search history.

(56) References Cited

U.S. PATENT DOCUMENTS

| | | | | |
|---|---|---|---|---|
| 7,221,366 | B2* | 5/2007 | Uyttendaele | G06T 15/205 345/427 |
| 7,224,357 | B2* | 5/2007 | Chen | G06T 7/593 345/420 |
| 7,292,257 | B2* | 11/2007 | Kang | G06T 15/205 345/419 |
| 7,489,812 | B2* | 2/2009 | Fox | G06T 7/55 382/154 |
| 7,509,241 | B2* | 3/2009 | Guo | G06T 17/05 703/2 |
| 8,633,970 | B1* | 1/2014 | Mercay | G09G 3/003 348/46 |
| 8,933,925 | B2* | 1/2015 | Sinha | G06T 7/55 345/419 |
| 9,041,709 | B2* | 5/2015 | Bruls | H04N 13/128 345/419 |
| 9,158,994 | B2* | 10/2015 | Schreer | H04N 13/128 |
| 9,208,541 | B2* | 12/2015 | Kim | G06T 7/194 |
| 9,412,172 | B2* | 8/2016 | Sorkine-Hornung | G06T 7/557 |
| 9,672,446 | B1* | 6/2017 | Vallespi-Gonzalez | H04N 13/239 |
| 9,779,546 | B2* | 10/2017 | Hunt | G01B 11/00 |
| 9,838,674 | B2* | 12/2017 | Cho | H04N 13/366 |
| 9,947,096 | B2* | 4/2018 | Atzpadin | G06T 7/593 |
| 10,008,004 | B1* | 6/2018 | Duan | G06K 9/4676 |
| 10,096,116 | B2* | 10/2018 | Cordara | H04N 13/128 |
| 10,116,915 | B2* | 10/2018 | Mogalapalli | G06T 5/005 |
| 10,165,251 | B2* | 12/2018 | Lakshminarayanan | H04N 13/139 |
| 10,412,368 | B2* | 9/2019 | Osterwood | H04N 5/2253 |
| 10,419,741 | B2* | 9/2019 | Calpe Maravilla | H04N 13/271 |
| 10,453,185 | B2* | 10/2019 | Dal Mutto | G06T 7/285 |
| 10,453,249 | B2* | 10/2019 | Smirnov | G06T 5/001 |
| 2004/0109585 | A1* | 6/2004 | Tao | G06T 7/579 382/106 |
| 2006/0050952 | A1* | 3/2006 | Blais | G01S 17/89 382/154 |
| 2010/0289797 | A1* | 11/2010 | Tateno | G06T 7/13 345/419 |
| 2011/0032341 | A1* | 2/2011 | Ignatov | H04N 13/144 348/51 |
| 2011/0080466 | A1* | 4/2011 | Kask | G06T 5/006 348/43 |
| 2012/0140038 | A1* | 6/2012 | Bi | H04N 13/271 348/46 |
| 2012/0320153 | A1* | 12/2012 | Barcons-Palau | H04N 13/156 348/42 |
| 2013/0121559 | A1* | 5/2013 | Hu | G06T 7/593 382/154 |
| 2014/0176539 | A1* | 6/2014 | Tsubaki | G06T 7/593 345/419 |
| 2014/0241637 | A1* | 8/2014 | Schreer | G06K 9/00201 382/218 |
| 2014/0270486 | A1* | 9/2014 | Atzpadin | G06T 7/593 382/154 |
| 2014/0313191 | A1* | 10/2014 | Bruls | G06T 15/04 345/419 |
| 2015/0350669 | A1 | 12/2015 | Gandolph | |

OTHER PUBLICATIONS

Robert T. Collins, "A Space-Sweep Approach to True Multi-Image Matching", in Computer Vision and Pattern Recognition, IEEE Computer Society Conference on, Los Alamitos, CA, USA, 1996, vol. 0, p. 358, IEEE Computer Society.

Maarten Dumont et al, "Immersive Teleconferencing with Natural 3D Stereoscopic Eye Contact Using GPU Computing", in Proceedings of 3D Stereo Media, Liege, Belgium, Feb. 2010.

Maarten Dumont et al, "Optimized Two-Party Video Chat with Restored Eye Contact Using Graphics Hardware", in e-Business and Telecommunications, vol. 48, pp. 358-372, 2009.

Maarten Dumont et al, "A Prototype for Practical Eye-Gaze Corrected Video Chat on Graphics Hardware", in SIGMAP, Jul. 2008, pp. 236-243.

Sammy Rogmans et al, "Real-time stereo-based view synthesis algorithms: A unified framework and evaluation on commodity GPUs", Image Commun., vol. 24, No. 1-2, pp. 49-64, Jan. 2009.

Sammy Rogmans et al, "Complexity Reduction of Real-time Depth Scanning on Graphics Hardware", in VISAPP, 2009, pp. 547-550.

Ruigang Yang et al, "A Unified Approach to Real-Time, Multi-Resolution, Multi-Baseline 2D View Synthesis and 3D Depth Estimation using Commodity Graphics Hardware", International Journal of Image and Graphics, pp. 1-34, Aug. 6, 2003.

Greg Welch et al, "Improving, Expanding and Extending 3d Telepresence", in Proceedings of the 2005 International Workshop on Advanced Information Processing for Ubiquitous Networks, 15th International Conference on Artificial Reality and Telexistence (ICAT2005), Canterbury, Christchurch, New Zealand, Jan. 2005.

A. Criminisi et al, "Gaze Manipulation for One-to-one Teleconferencing", in International Conference on Computer Vision, Los Alamitos, CA, USA, 2003, IEEE Computer Society, vol. 1, pp. 1-8.

Jin Liu et al, "A Computational Approach to Establish Eye-Contact in Videocommunication", in Proceedings of International Workshop on Stereoscopic and Three Dimensional Imaging, (IWS3D1), Greece, Sep. 1995, pp. 229-234.

Maximilian Ott et al, "Teleconferencing eye contact using a virtual camera", in INTERACT '93 and CHI '93 conference companion on Human factors in computing systems—CHI '93, Amsterdam, The Netherlands, 1993.

J. Cox et al, "Stereo Without Disparity Gradient Smoothing: a Bayesian Sensor Fusion Solution", in BMVC'92, D. H. B. Dphil, MSc and R. B. Ba, Eds., pp. 337-346. Springer London, 1992.

Jens-Rainer Ohm, et al, "A realtime hardware system for stereoscopic videoconferencing with viewpoint adaptation", Signal Processing: Image Communication, vol. 14, No. 1-2, pp. 147-171, Nov. 1998.

Yu-Pao Tsai et al, "Real-Time Software Method for Preserving Eye Contact in Video Conferencing", Journal of Information Science and Engineering, vol. 20, No. 5, pp. 1001-1017, 2004.

Òscar Divorra et al, "Towards 3D-Aware Telepresence: Working on Technologies Behind the Scene", in Proc. of ACM Conference on Computer Supported Cooperative Work (CSCW), New Frontiers in Telepresence, Savannah, Georgia, USA, Feb. 2010.

Peter Kauff et al, "An Immersive 3D Video-conferencing System Using Shared Virtual Team User Environments", in Proceedings of the 4th International Conference on Collaborative Virtual Environments, New York, NY, USA, 2002.

B. J. Lei et al, "Real-Time Multi-Step View Reconstruction for a Virtual Teleconference System", EURASIP J. Appl. Signal Processing 2002:10, pp. 1067-1087, Jan. 2002.

I. Feldmann et al, "Real-time depth estimation for immersive 3D videoconferencing", in 3DTV-Conference: The True Vision—Capture, Transmission and Display of 3D Video (3DTV-CON), 2010, Jun. 2010, pp. 1-4.

(56) References Cited

OTHER PUBLICATIONS

I. Feldmann et al, "Multi-view depth estimation based on visual-hull enhanced Hybrid Recursive Matching for 3D video conference systems", in 2009 16th IEEE International Conference on Image Processing (ICIP), Nov. 2009, pp. 745-748.

Peter Kauff et al, "An universal algorithm for real-time estimation of dense displacement vector fields", in Proc. of Int. Conf. on Media Futures, Florence, Italy, 2001.

"cuRAND", 10 Explanation of CUDA Function to create random variables, Sep. 2014.

Christian Riechert et al, "Real-Time Disparity Estimation Using Line-Wise Hybrid Recursive Matching and Cross-Bilateral Median Up-Sampling", in 21st International Conference on Pattern Recognition (ICPR). Nov. 11-15, 2012, pp. 3168-3171, IEEE.

Christian Riechert et al, "Fully Automatic Stereo-to-Multiview Conversion in Autostereoscopic Displays", The Best of IET and IBC, vol. 4, pp. 8-14, Sep. 2012.

Heiko Hirschmüller, "Accurate and Efficient Stereo Processing by Semi-Global Matching and Mutual Information", in IEEE Computer Society Conference on Computer Vision and Pattern Recognition, CVPR 2005, vol. 2, pp. 807-814.

Heiko Hirschmuller, "Stereo Processing by Semi-Global Matching and Mutual Information", IEEE Transactions on Pattern Analysis and Machine Intelligence, vol. 30, No. 2, pp. 1-14, Feb. 2008.

Heiko Hirschmüller, "Stereo Vision in Structured Environments by Consistent Semi-Global Matching", in Proceedings of the 2006 IEEE Computer Society Conference on Computer Vision and Pattern Recognition—vol. 2, Jun. 17-22, 2006, pp. 2386-2393, IEEE Computer Society.

Simon Hermann et al, "Iterative Semi-Global Matching for Robust Driver Assistance Systems", in Computer Vision—ACCV 2012, No. 7726 in Lecture Notes in Computer Science, pp. 465-478, Nov. 2012.

Ines Ernst et al, "Mutual Information Based Semi-Global Stereo Matching on the GPU", in Advances in Visual Computing, No. 5358 in Lecture Notes in Computer Science, pp. 228-238, Dec. 1-3, 2008.

Matthias Michael et al, "Real-Time Stereo Vision: Optimizing Semi-Global Matching", in 2013 IEEE Intelligent Vehicles Symposium (IV), Jun. 2013, pp. 1197-1202.

Heiko Hirschmüller et al, "Memory Efficient Semi-Global Matching" ISPRS Annals of the Photogrammetry, Remote Sensing and Spatial Information Sciences, vol. 3, pp. 371-376, 2012.

Dominik Honegger et al, "Real-time and Low Latency Embedded Computer Vision Hardware Based on a Combination of FPGA and Mobile CPU", in 2014 IEEE/RSJ International Conference on Intelligent Robots and Systems (IROS 2014), Sep. 14-18, 2014, pp. 4930-4935.

Maximilian Buder, "Dense realtime stereo matching using a memory efficient Semi-Global-Matching variant based on FPGAs", in SPIE Photonics Europe. 2012, International Society for Optics and Photonics.

Christian Banz et al, "Real-Time Stereo Vision System using Semi-Global Matching Disparity Estimation: Architecture and FPGA-Implementation", in 2010 International Conference on Embedded Computer Systems (SAMOS), Jul. 2010, pp. 93-101.

M. Bleyer et al, "PatchMatch Stereo-Stereo Matching with Slanted Support Windows", in BMVC, 2011, vol. 11, pp. 1-11.

Connelly Barnes et al, "PatchMatch: A Randomized Correspondence Algorithm for Structural Image Editing", ACM Transactions on Graphics—TOG, vol. 28, No. 3, 2009.

Philipp Heise et al, "PM-Huber: PatchMatch with Huber Regularization for Stereo Matching", in 2013 IEEE International Conference on Computer Vision (ICCV), Dec. 2013, pp. 2360-2367.

Jiangbo Lu et al, "Patch Match Filter: Efficient Edge-Aware Filtering Meets Randomized Search for Fast Correspondence Field Estimation", in 2013 IEEE Conference on Computer Vision and Pattern Recognition (CVPR), Jun. 2013, pp. 1854-1861.

Frederic Besse et al, "PMBP: Patchmatch Belief Propagation for Correspondence Field Estimation", International Journal of Computer Vision, vol. 110, No. 1, pp. 1-11, Oct. 2013.

Shibiao Xu et al, "PM-PM: PatchMatch With Potts Model for Object Segmentation and Stereo Matching", IEEE Transactions on Image Processing, vol. 24, No. 7, pp. 2182-2196, Jul. 2015.

Daniel Scharstein et al, "A Taxonomy and Evaluation of Dense Two-Frame Stereo Correspondence Algorithms", International Journal of Computer Vision, vol. 47, No. 1, Apr. 2002.

Nils Einecke et al, "Stereo Image Warping for Improved Depth Estimation of Road Surfaces", in 2013 IEEE Intelligent Vehicles Symposium (IV), Jun. 2013, pp. 189-194.

Stefan K. Gehrig et al, "Exploiting Traffic Scene Disparity Statistics for Stereo Vision", in 2014 IEEE Conference on Computer Vision and Pattern Recognition Workshops (CVPRW), Jun. 2014, pp. 674-681.

Wolfgang Waizenegger et al, "Patch-Sweeping with robust prior for high precision depth estimation in real-time systems", in Proc. International Conference on Image Processing (ICIP), Brussels, Belgium, 2011.

Richard Hartley et al, "Multiple View Geometry in Computer Vision", Cambridge University Press, 2nd edition, Mar. 2004. Standard Computer Vision Book.

Frederik Zilly, et al., "Semantic Kernels Binarized—A Feature Descriptor for Fast and Robust Matching", pp. 39-48, in European Conference on Visual Media Production (CVMP), 2011.

\* cited by examiner

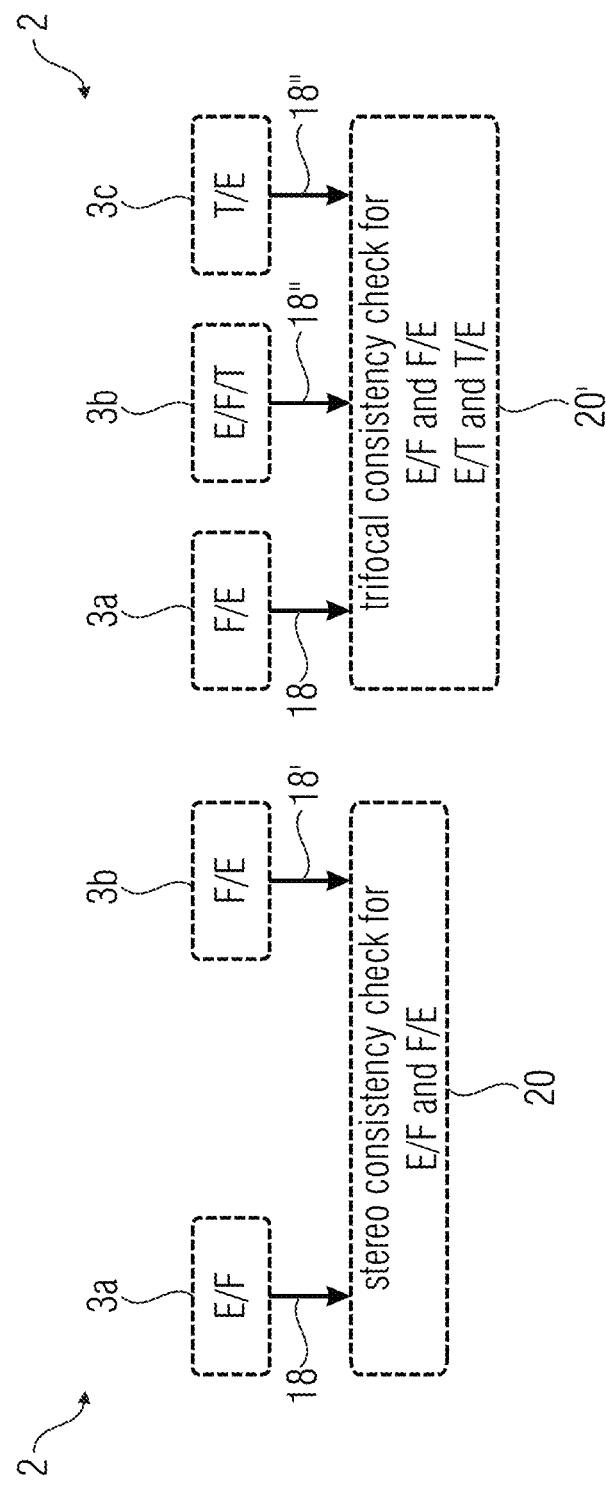

| short | disparity | depth | normal | perspective |
|---|---|---|---|---|
| DI | ✓ | — | — | — |
| DE | — | ✓ | — | — |
| DEP | — | ✓ | — | ✓ |
| DEPN | — | ✓ | ✓ | ✓ |

Fig. 5

Fig. 7

APPARATUS AND METHOD FOR PERFORMING 3D ESTIMATION BASED ON LOCALLY DETERMINED 3D INFORMATION HYPOTHESES

CROSS-REFERENCE TO RELATED APPLICATIONS

This application is a continuation of copending International Application No. PCT/EP2017/063183, filed May 31, 2017, which claims priority from European Application No. EP 16 172 527.0, filed Jun. 1, 2016, which are each incorporated herein in its entirety by this reference thereto.

The present application relates to an apparatus and a method for performing 3D estimation on the basis of pictures of at least two different views using locally determined 3D information hypotheses. Embodiments relate to optimization through information propagation driven by local statistics.

BACKGROUND OF THE INVENTION

In the following the focus is on algorithms that are either employed to video communication scenarios or known to work robustly and reliable in real-time production environments or have a conceptual relationship to the presented work. For each algorithm a brief review of its properties, functionality and application domain is provided.

Until today many algorithms incorporate basic functionalities from approaches that have been developed in the early years of stereo processing. Especially, the comparison of different image blocks [1] or spatial planes [2] for the evaluation of local stereo hypotheses is still part of many approaches in the real-time domain. Among the vast amount of reported algorithms that can be associated to this category, there are a few algorithms that have been applied to the domain of eye contact preserving video communication. Here, the computed 3D information is used for the synthesis of novel views according to the eye contact position. In a recent approach [3][4][5] the authors use a new flavour of the plane sweeping technique that has been reported in detail [6][7]. Similarly, another plane sweep variant that can include multiple views [8] has been applied within a medical telepresence scenario [9].

In case of rectified stereo configuration the estimation of horizontal disparities has been pursued in many approaches. Based on the basic block matching idea, different approaches for the definition and computation of optimal disparity values are proposed. For this task the application of dynamic programming has been reported in order to balance between computational complexity and the incorporation of greater image regions instead of pure local matching, e.g. [10], [11] and [12] that is founded on some early work from Cox et al. [13]. Other authors propose the application of hierarchical block matching schemes implemented in hardware solutions [14] or even a global optimization of the disparity map in terms of post-processing the results of an adaptive window based matching approach [15]. While the listed disparity estimation algorithms are diverse, all of them are designed to evaluate a fixed disparity range. Regarding this characteristic, the authors of [16][17][18] propose an Hybrid Recursive Matching (HRM) algorithm that is not restricted to a predefined set of disparity values [19][20][21]. Instead, the information is propagated via a meander wise traversal of the image. New disparities are generated by disparity updates that are computed based on optical flow principles. However, the meander wise image traversal cannot be parallelized. Based on the initial work on HRM there has been some effort towards a parallelization on multi-core platforms. While the resulting Line-Wise Hybrid Recursive Matching (L-HRM) algorithm [22][23] is employed in the domain of entertainment, broadcasting and post-processing, like stereo to multi-view conversion [24], wherein L-HRM conducts line wise disparity information propagation.

In other real-time application domains like autonomous driving, robotics and aerial photography the Semi-Global Matching (SGM) approach [25] has been intensively investigated and implemented for about a decade. Based on the initial work on SGM there have been improvements in terms of un-textured area handling [26][27] that resulted in the Consistent Semi-Global Matching (CSGM) algorithm. Other authors proposed an iterative Semi-Global Matching (iSGM) algorithm [28] with focus on driver assistance systems. Here, an algorithmic optimization is realized via the reduction of the disparity search space by an iterative cost path evaluation. At the same time, a parallel implementation on graphics hardware has been provided [29] and further improved [30] in order to enable SGM for the application to real-time domains. As graphics hardware is not always available in application domains with embedded architectures, there have been additional developments for the implementation of SGM on FPGAs [31][32][33][34].

A further algorithm is PatchMatch Stereo [35]. Based on an algorithm for patch based image editing [36] the basic idea has been extended to stereo processing. The initial patch parameters are randomly drawn. The meander wise image traversal for spatial information propagation that is used in HRM, is also part of the iteration step of PatchMatch Stereo. Moreover, HRM and PatchMatch Stereo also share the same principle of temporal predecessor propagation that has been discussed earlier. Finally, PatchMatch Stereo introduces a randomized plane refinement step. PatchMatch Stereo uses a fixed randomization for plane refinement and a constant reduction rule for the refinement range of the variables.

Various enhancements [37][38][39][40] for PatchMatch Stereo have been proposed. In [37] a Huber regularized variational smoothing has been proposed that is applied after each Patch-Match iteration. Here, the optimization is carried out on a relaxed version of the formulated energy term via a primal dual formulation of the Huber-ROF model. While the stereo results could be significantly improved in comparison to the initial PatchMatch algorithm, the runtime has been lifted to the range of minutes. The authors of [38] included an edge aware filter to the randomized search and use a superpixels representation for the matching procedure. The runtime of the improved algorithm is reported to be in the range of seconds for the Middlebury test dataset [41]. An extension with focus on the optimization of a global data term via belief propagation has been proposed in [39]. Among the discussed PatchMatch extensions it is the computationally most expensive variant with more than 1000 seconds processing time for 0.3 megapixels [40]. Another variational approach based on the Potts model has been proposed in [40]. Beside stereo processing this specific extension enables for a joint object segmentation and 3D analysis while offering a runtime of several hundred seconds on moderate image sizes.

In the automotive domain specialized algorithms for processing road surfaces have been developed [42][43]. Here, the prior knowledge about the fixed type of stereo scene is used to guide the algorithm while performing the 3D analysis. The authors propose either the pre-processing of the input images in order to improve the matching process [42] or to create a mean disparity map for the average road surface that can be used as a cue for disparity selection [43].

However, all of the described approaches cannot be performed entirely in parallel, since the calculation of 3D information for a current pixel relates to the 3D information determined for a preceding pixel of the same iteration or they perform a further (alternative) approach for calculating 3D information that is improvable in terms of computational efficiency. Since the 3D information of the preceding pixel should be known before determining the information for the current pixel, a parallelization is only possible up to a certain degree.

Therefore, there is a need for an improved approach.

SUMMARY

According to an embodiment, an apparatus for performing 3D estimation on the basis of pictures of at least two different views may have: a hypotheses provider configured for determining, for each position of positions of a current picture of a first view, 3D information hypotheses on the basis of a pre-estimated depth/disparity map of the current picture of the first view; a similarity measure calculator for calculating, for each position of the current picture of the first view, a similarity, for each of the 3D information hypotheses of the respective position, between a region of the current picture of the first view at the respective position and a corresponding region of a second view of the at least two different views located at a position displaced relative to the respective position by the respective 3D information hypothesis; and a 3D information determiner configured to select, for each position of the first view, the 3D information hypothesis of highest similarity in order to acquire an updated depth/disparity map.

According to another embodiment, a method for performing 3D estimation on the basis of pictures of at least two different views may have the steps of: determining 3D information hypotheses for each position of positions of a current picture of a first view on the basis of a pre-estimated depth/disparity map of the current picture of the first view; calculating, for each position of the current picture of the first view, a similarity for each of the 3D information hypotheses of the respective position between a region of the current picture of the first view at the respective position and a corresponding region of a second view of the at least two different views located at a position displaced relative to the respective position by the respective 3D information hypothesis; and selecting, for each position of the first view, the 3D information hypothesis of highest similarity in order to acquire an updated depth/disparity map.

Another embodiment may have a non-transitory digital storage medium having a computer program stored thereon to perform the method for performing 3D estimation on the basis of pictures of at least two different views, the method including: determining 3D information hypotheses for each position of positions of a current picture of a first view on the basis of a pre-estimated depth/disparity map of the current picture of the first view; calculating, for each position of the current picture of the first view, a similarity for each of the 3D information hypotheses of the respective position between a region of the current picture of the first view at the respective position and a corresponding region of a second view of the at least two different views located at a position displaced relative to the respective position by the respective 3D information hypothesis; and selecting, for each position of the first view, the 3D information hypothesis of highest similarity in order to acquire an updated depth/disparity map, when said computer program is run by a computer.

According to embodiments, an apparatus for performing 3D estimation on the basis of pictures of at least two different views comprises a hypotheses provider, a similarity measure calculator, and a 3D information determiner. The hypotheses provider is configured for locally determining 3D information hypotheses for positions of a current picture of a first view of the at least two different views on the basis of a pre-estimate which associates a 3D information estimate to each position of a picture of the first view. The similarity measure calculator is configured for calculating, for each position of the current picture of the first view, a similarity measure for each of the 3D information hypotheses of the respective position by measuring a similarity between a region of the current picture of the first view at the respective position and a corresponding region of a second view of the at least two different views located at a position displaced relative to the respective position by a respective 3D information hypothesis. The 3D information determiner is configured to select, for each position of the first view, the 3D information hypothesis of highest similarity measure.

The application is based on the finding that it is feasible to perform an estimation of 3D picture information locally for one pixel only using 3D information estimates (such as a depth/disparity map) of a previous picture, for example in a sequence of video frames, or a preceding iteration of the current picture, wherein each iteration improves the quality of the 3D information determined in the preceding iteration. Since in a current iteration, a 3D information estimate for one pixel is chosen from a small number (for example≤6) hypotheses of possible 3D information estimates, the computational efficiency is further improved compared to approaches where a large set of hypotheses is tested. Thus, it is possible to parallelize the 3D information determination in the graphics processing unit (GPU), where, for example, 10000 cores may perform a parallel computation such that the depth/disparity information of 10000 pixels may be calculated in parallel or at the same time.

Moreover, a numerical (or deterministic) update of a current position using from a preceding picture to the current picture based on neighboring pixels may be avoided. Instead, a list of hypotheses is built based on randomly determined hypotheses. According to an embodiment, a hypotheses update for a current position may be performed by randomly updating the 3D information estimate of the current position, which may be determined in a preceding iteration on the current picture or in a preceding iteration on a preceding frame or image, to determine an updated 3D information hypothesis of the current position of the current picture. The randomized update values may be determined by calculating a random value based on a statistical distribution of update values. The statistical distribution of update values may be estimated based on a predetermined distribution of update values, meaning that a probability density function of update values of depth and/or disparity values from one frame to another typically forms a normal distribution. The normal distribution with suitable values for the estimated value and the variance may therefore once be determined from different sequences of video frames not related to the current picture. This may especially be suitable for the first frames, e.g. the frames within the first sequence, of a video, where no at least less sufficient depth/disparity update values of the video are available. However, more accurate may be a determination of the update values based on the knowledge of the current video.

Therefore, the statistical distribution of update values may be based on previously determined update values. Thus, samples of update values, such as e.g. the depth/disparity update values from one frame to another, determined in a preceding sequence of pictures or from multiple preceding sequences of pictures may be used to form a (discrete) probability density function. Based on this probability density function, random update values for updating depth/disparity values of a current position may be determined. In other words, the probability density function may be determined from update values for each position of the picture and is thus constant during 3D estimation of one picture or frame or even a sequence of pictures or frames. However, the probability density function may be replaced or updated after processing of a picture or a sequence of pictures is performed. Updating the probability density function may be performed using weighted updating such that a contribution of preceding iterations is reduced by weighting the update values with a decreasing weight (even up to zero) for an increasing distance of the preceding iteration to the current iteration. These described statistics, such as the predetermined distribution of update values (such as a normal distribution) or the probability density function determined based on previously determined update values of the current sequence of pictures or the current video, may be referred to as suitable statistics for the hypotheses update.

According to an additional or alternative embodiment, the list of hypotheses comprises at least one randomly selected hypothesis of neighboring pixels of the preceding iteration (or the previous frame). This may further reduce the computational complexity of the algorithm performed by the apparatus without affecting the rate of convergence and thus not reducing the performance of the 3D information estimation.

Embodiments show that the apparatus may perform an Iterative Patch Sweeping (IPS) algorithm using a correspondence analysis algorithm. According to further embodiments, the apparatus is configured to perform a parallel, iterative and pixel wise neighborhood propagation of the IPS algorithm. Additionally, IPS may apply a principle of temporal predecessor propagation and left-right consistency check where outliers and/or occlusion detection is performed.

According to embodiments, the hypotheses provider is configured for determining at least one 3D information hypothesis of the 3D information hypotheses for a current position of the current picture of the first view using one or more neighboring positions of the respective current position of the pre-estimate. To determine suitable neighbors, a deterministic spatial neighborhood may be defined. Based on this static neighborhood, hypotheses may be determined by selecting a number of 3D information estimates of the available neighbors or to determine a measure of available 3D information estimates of the available neighbors, for example, a mean value of 3D information estimates of opposite neighbors. Furthermore, it may be thought of any further calculation of 3D information hypotheses based on the available neighbors.

Additionally or alternatively, it may be used a randomized spatial neighborhood. Compared to the deterministic spatial neighborhood, the randomized spatial neighborhood improves the convergence properties and reduces artefacts known as specular noise. Furthermore, using the randomized spatial neighborhood does not increase but may even reduce the number of iterations to be performed on a picture to achieve the same accuracy of the predicted or estimated 3D information. The randomized spatial neighborhood is based on a statistical distribution of neighbors of a current pixel. This distribution may be based on, for example, a similarity measure indicating whether a 3D information estimate provides a good or a bad estimate of the 3D information. Thus, a distribution of the neighbors based on their similarity to the actual determined result increases the probability that this 3D information estimate is propagated to other neighboring pixels within only a few iterations. This is advantageous since a texture of the picture usually comprises homogeneous parts, wherein a good 3D estimate in a direct neighborhood of a current pixel is a good 3D estimate for the current pixel as well, if both are located in a homogeneous area.

According to further embodiments, the apparatus is configured to perform a hypothesis update of the same pixel of a previous picture or a previous iteration of the same picture based on the similarity measure. The similarity measure may reflect an error or a residual in the current 3D information estimate, which may be determined by applying the 3D information estimate to the pixel or a region around the pixel of the first view and thus warping the current pixel or the region around the pixel and to compare the result with a picture of a corresponding second view. Based on the similarity measure, a further shift and/or perspective distortion may be determined. Thus, the 3D information estimate may be updated by a value corresponding to the determined shift or perspective distortion. Since a test of such a patch on similarity shall not be based on the 3D information of the neighbors of the current iteration in order to allow parallel processing of the pixels, the used 3D information estimate may be obtained from the neighboring pixels of a previous iteration or the previous picture.

BRIEF DESCRIPTION OF THE DRAWINGS

Embodiments of the present invention will be detailed subsequently referring to the appended drawings, in which:

FIG. 3 shows a schematic flowchart of a consistency check in case of stereo (left) and trifocal (right) camera configurations;

FIG. 5 shows a table schematically indicating an overview on the evaluated hypothesis representation;

FIG. 7 shows a schematic representation of a depth/disparity map indicating a comparison of intermediate results for the third iteration of all algorithmic configurations listed in FIG. 11, wherein results for the multi-scale sweep are shown on the bottom and wherein the images on the left are computed based on $N^4$ and on the right based on $N^4_R$;

DETAILED DESCRIPTION OF THE INVENTION

In the following, embodiments of the invention will be described in further detail. Elements shown in the respective figures having the same or a similar functionality will have associated therewith the same reference signs.

In contrast to previous work [44] on prior constraint patch sweeping, the main idea of the proposed algorithm is to generate prior information in the course of the sweeping procedure instead of an external prior injection. Here, the target is to replace the Hybrid Recursive Matching (HRM) prior by an integrated approach in order to eliminate the drawbacks of a workload distribution between CPU an GPU. Regarding the HRM prior for video communication from a very practical side, because of the workload distribution between CPU and GPU the downside of this procedure is an inherent latency overhead caused by processing the multi-view input first on CPU, store the result to main memory and then upload all data to GPU. In case of HRM prior there is an additional computational overhead in terms of rectification of input images, the conversion of disparities to depth values and de-rectification of the resulting depth image. In the following the sweeping procedure on GPU is extended by the integration of a spatial and temporal interdependency that can be iteratively evaluated in parallel. While the presented approach is inspired by the spatial and temporal neighborhood processing of HRM the algorithmic structure differs significantly. In contrast to the meanderwise image traversal and the recursive structure of HRM that makes parallelization impractical by design, iterative spatial and frame temporal neighborhoods are embedded into a family of iteration schemes that can be processed efficiently in parallel on graphics hardware. In contrast to a combination of HRM prior and exhaustive sweep, the benefits are:

A GPU centric algorithm completely removes computational load from CPU.

Computational overhead for image rectification, disparity to depth conversion and depth map de-rectification is avoided.

Inclusion of spatial and temporal neighborhood leads to lower computational complexity compared to exhaustive sweep.

A monolithic algorithm does not only eliminate the latency overhead caused by transferring the results between main memory and graphics memory, but also allows for an efficient re-use of intermediate results without additional data exchange between CPU and GPU.

Figure 1A:
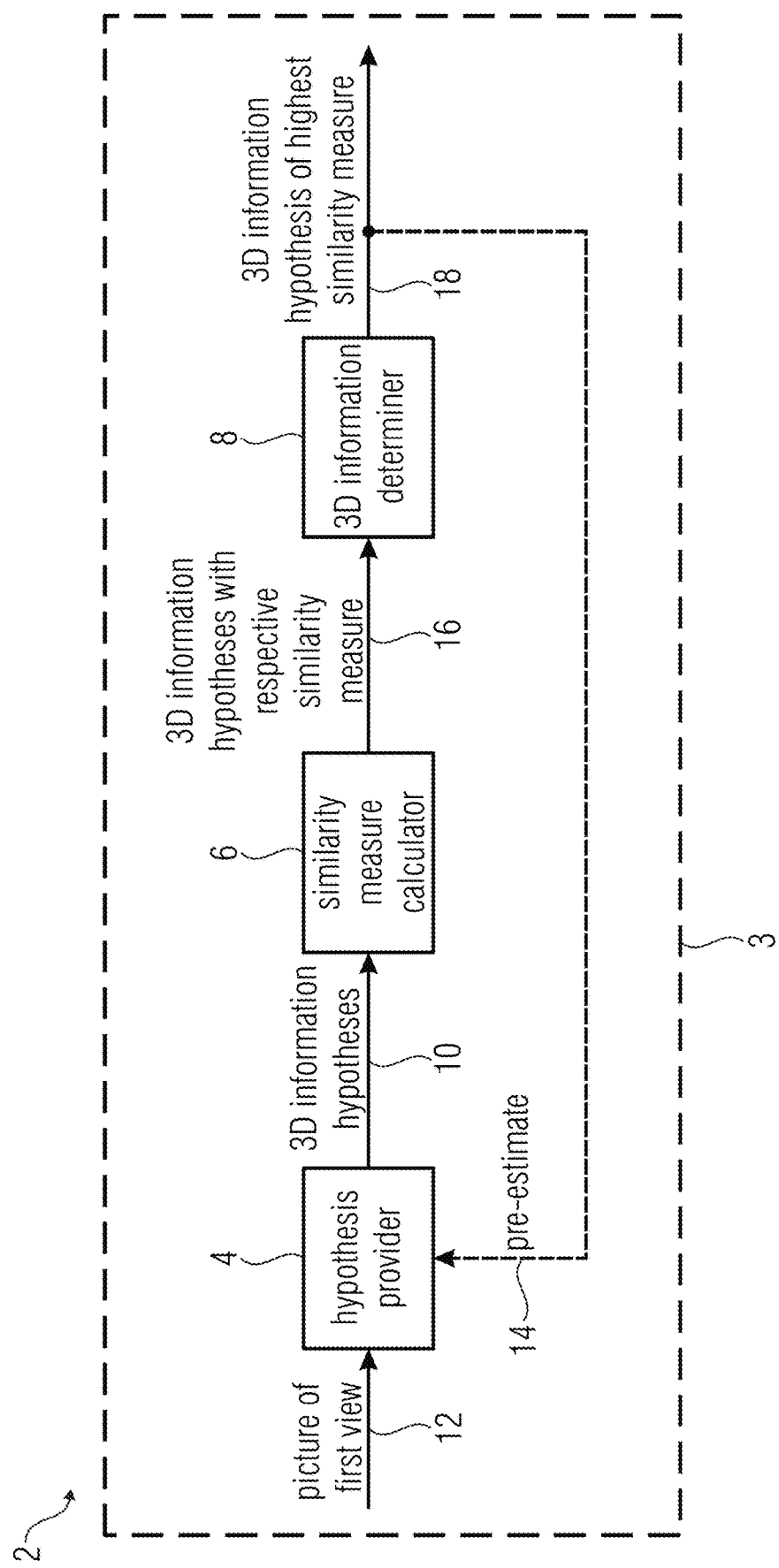
FIG. 1a shows a schematic block diagram of an apparatus for performing 3D estimation.

FIG. 1a shows a schematic block diagram of an apparatus 2 for performing 3D estimation on the basis of pictures of at least two different views. The apparatus 2 comprises a hypotheses provider 4, a similarity measure calculator 6, and a 3D information determiner 8. The hypotheses provider is configured for locally determining 3D information hypotheses 10 for positions of a current picture of a first view 12 of the at least two different views on the basis of a pre-estimate 14, which associates a 3D information estimate as to each position of the current picture of the first view 12. According to embodiments, a position of the current picture may be a pixel of the current picture, a group of pixels of the current picture or any other partial subdivision of the picture. Therefore, the hypotheses provider locally determines the 3D information hypotheses. Locally may refer to a determination of the 3D information hypotheses solely for the current position or pixel without using information from surrounding or neighboring pixels of the current picture (in the current iteration). In other words, for determining the 3D information hypothesis, only information from a preceding picture or information from the same picture of a preceding iteration is used. In even other words, the hypotheses provider 4 is configured to perform the determination of the 3D information hypotheses 10 independently for different positions of the current picture 26 of a first view 12, i.e. the determination of the 3D information hypotheses 10 is done for each position of the positions of the current picture 26 of the first view 12 on the basis of a pre-estimated depth/disparity map 28, namely a portion collocated to the respective position, and independent from the 3D information hypothesis 18 of highest similarity selected for any surrounding position of the positions of the current picture 26 of the first view 12.

The similarity measure calculator 6 is configured for calculating, for each position of the current picture of the first view 12, a similarity or a similarity measure 16 for each of the 3D information hypothesis 10 of the respective position by measuring a similarity between a region of the current picture of the first view 12 at the respective position and a corresponding region of a second view of the at least two different views located at a position displaced relative to the respective position by the respective 3D information hypotheses. In other words, a set of potential 3D information estimates, the 3D information hypotheses, are applied to a region of the current picture of the first view at the respective position. The region may be the current pixel (i.e. one pixel) or current position or a patch of a number of pixels greater than the number of pixels of the current position.

By applying the 3D hypotheses to the region, the region is transformed to the respective position of the current picture of the second view. However, since the transformed region may not completely match or fit the position of the picture of the second view, a residual or a difference between the regions may occur. The residual is the difference between the transformed region and the actual region of the second view, e.g. the region of the picture of the first view is transformed on. The difference or residual may be measured in an (absolute or relative) shift of the center of the transformed region from the determined (ideal or optimal) center of the corresponding region of the picture of the second view. A further residual may be the orientation of the transformed region with respect to the optimal determined orientation of the corresponding region in the picture or the second view. This transformation and residual calculation may be performed for each 3D information hypothesis. Furthermore, the 3D information determiner is configured to select for each position of the first view the 3D information hypothesis 18 of highest similarity measure, such as the best fitting transformed patch of the out of the different possible transformations, one transformation calculated using one 3D information hypothesis of the 3D information hypotheses. Therefore, the selected information hypothesis 18 becomes the 3D information estimate for the current pixel or position.

Figure 8:
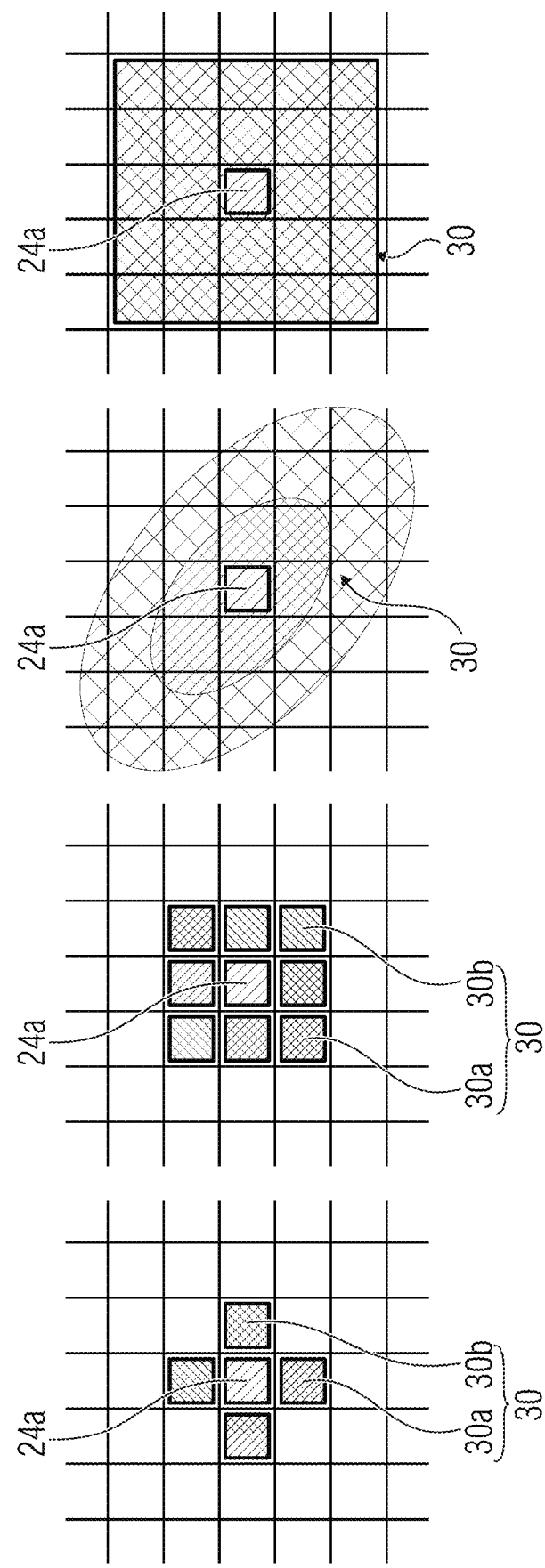
FIG. 8 schematically illustrates different neighborhoods wherein from left to right a deterministic 4 neighborhood, a deterministic 8 neighborhood, a randomized neighborhood with an underlying novel distribution, and a randomized neighborhood with an underlying uniform distribution is shown, wherein the marked pixel in the center of each grid indicates the neighborhood center and therefore the current pixel for which the 3D information hypotheses is determined.

According to embodiments, the hypotheses provider is configured for determining at least one 3D information hypothesis of the 3D information hypotheses for a current position of the current picture of the first view using one or more neighboring positions of the respective current position of the pre-estimate. In embodiments, the pre-estimate 14 is a preceding picture of the current picture in a sequence of pictures having 3D information estimates for each position of the preceding picture. Therefore, the 3D information hypothesis 10 may be determined by the hypotheses provider using the 3D information estimate of neighboring pixels or positions of the current position. Different neighborhoods where the neighboring pixels or positions may be part of are shown with respect to FIG. 8.

According to further embodiments, the apparatus 2 may perform a further iteration for performing 3D information estimation on the basis of the current picture, wherein the 3D information estimate of each position of the current picture of the current picture of the first view of the further iteration are the selected 3D information hypothesis 18 for positions of the current picture of a preceding iteration. In other words, the picture of the first view 12 associated with the 3D information hypothesis of highest similarity measure for each pixel is the pre-estimate 14 of the further, subsequent iteration. The further iteration may refer to a further processing of the picture of the first view in order to improve the derived 3D information hypothesis for at least a part of the positions of the current picture. For the further iteration, the hypotheses provider may be configured for locally determining 3D information hypotheses for positions of a current picture of a first view of the at least two different views in the further iteration on the basis of the picture of the first view accompanied with 3D information hypothesis values of highest similarity measure of a preceding iteration or of a preceding picture. In even other words, the apparatus 2 uses in the further iteration information of the updated depth/disparity map that has been updated in the preceding iteration, this information is now the pre-estimated depth/disparity map.

In other words, according to embodiments, the hypotheses provider may determine the 3D information hypotheses for a current position of the current picture for the further iteration using selecting the 3D information estimate 14 of the current position of the current picture from an iteration preceding the further iteration and randomly selecting one or more 3D information estimates of one or more positions neighboring the current position of the current picture from an iteration preceding the further iteration. In this case, the further iteration may be referred to as the current iteration since the iteration is leading from a preceding picture to the current picture, wherein in general, the further iteration may lead from the current picture to a subsequent picture. Furthermore, the hypothesis provider may update the selected 3D information estimate of the current position of the current picture from an iteration preceding the further iteration using a random update value.

According to embodiments, the hypotheses provider 4 is configured for randomly selecting the 3D information estimates from a set of neighboring positions of the current position, wherein the set of neighboring positions is determined based on a statistical measure of the 3D information estimates. Moreover, the hypotheses provider 4 may be configured for randomly selecting 3D information hypotheses 10, 10' for a current position of the positions of the current picture of the first view using a statistical measure and for determining the 3D information hypotheses for a further position of the positions of the current picture of the first view different from the current position using a further statistical measure different from the statistical measure. The statistical measure may be a randomized spatial neighborhood e.g. with an underlying normal distribution or an underlying uniform distribution as the statistical measure or the further statistical measure.

In other words, the apparatus uses values of the updated depth/disparity map at positions neighboring the current position for determining the 3D information hypotheses.

According to further embodiments, additionally or alternatively to a deterministic hypotheses update, it may be performed a statistical update of the 3D information estimate of the current positions. Therefore, the hypotheses provider is configured for determining at least one 3D information hypothesis 10 of the 3D information hypotheses for a current position of the current picture of the first view using updating the 3D information estimate of the current position of the picture of the first view of the pre-estimate 28, 28' by a random update value with respect to a suitable statistic, wherein the hypotheses provider may be configured to determine the random update value based on a statistical distribution of update values. The hypotheses provider may further determine the statistical distribution of update values based on previously determined update values related to the positions. In other words, the statistical distribution of update values (which may be referred to as the suitable statistic) may be a probability density function of preceding updates of depth/disparity values, e.g. based on the update of each position of one or more preceding pictures or based on a general/universal estimate, such as a normal distribution. Thus, the random variable 38 (cf. FIG. 2c) may be one update value stochastically determined based on the probability density function.

Using the deterministic update, from one iteration to another, the 3D information hypothesis may be updated based on, for example, a deviation of a patch center and/or an orientation of the patch when the 3D information hypothesis is applied to a position or a region such that the region is transformed into the domain of the picture of the second view. However, a dissimilarity of the transformed region to the actual corresponding region may be used to calculate the residual information. Actual formulas for determining the residual information are described with respect to FIG. 5.

Figure 1B:
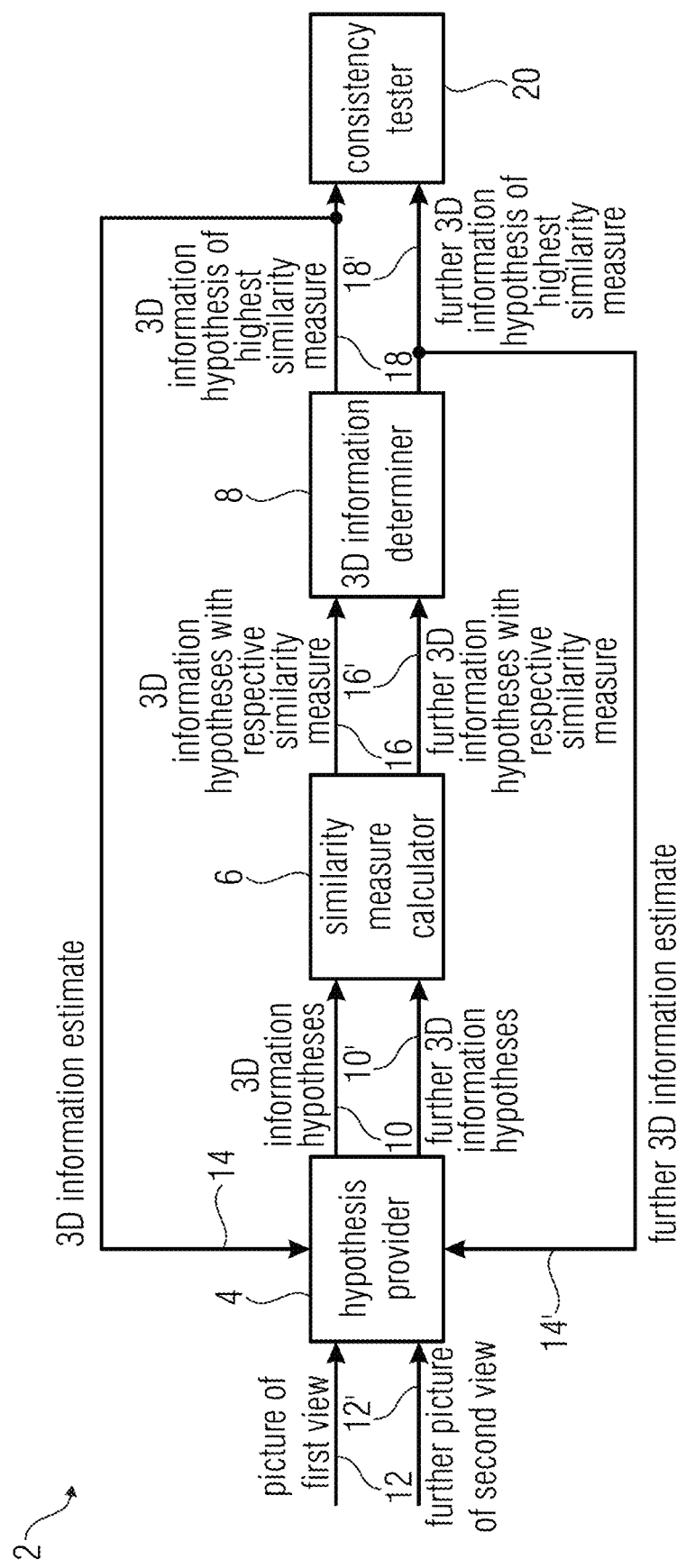
FIG. 1b shows a schematic block diagram of an apparatus for performing 3D estimation with a consistency test.

FIG. 1b shows the apparatus 2 according to further embodiments. With respect to FIG. 1a, FIG. 1b shows further signal paths, which are mirror-inverted to the already known signal paths of FIG. 1a. The added signal paths represent the processing of the picture of the second view 12' which may be performed analogously to the processing of the picture of the first view 12.

To be more precise, the hypotheses provider 4 is further configured for locally determining further 3D information hypotheses 10' for positions of the current picture of a second view 12' of the at least two different views on the basis of the pre-estimate 14 or a further pre-estimate 14', which associates a 3D information estimate to each position of the current picture of the second view 12'. Especially if the current iteration is the first iteration of the current picture, the pre-estimate may be the resulting or determined 3D image derived from the previous picture of the first view and the previous picture of the second view. The previous picture may comprise a common disparity/depth map representing or being the derived 3D information hypothesis of highest similarity measure for each position. Therefore, this previous picture may be a common pre-estimate, for example for a first iteration of the current picture for both, the first and the second view. However, having already performed an iteration on the current picture, the picture of the first view 12 and the picture of the second view 12' may comprise 3D information hypotheses that differ from the 3D information hypotheses of the respective other view, since the 3D information hypotheses have been updated or renewed. Thus, the pre-estimate 14 may derive the 3D information hypotheses based on the determined 3D information hypotheses of highest similarity measure determined from the previous iteration. Analogously, the pre-estimate 14' may be the resulting picture having 3D information estimates similar or equal to the 3D information hypotheses of highest similarity measure determined in the previous iteration.

The similarity measure calculator 6 may be further configured for calculating, for each position of the current picture of the second view 12', a similarity measure 16' (or similarity) for each of the further 3D information hypotheses 10' of the respective position by measuring a similarity between a region of the current picture of the second view 12' at the respective position and a corresponding region of the first view 12 of the at least two different views located at a position displaced relative to the respective position by the respective further 3D information hypotheses 16'. In other words, the determined further hypotheses 10' are tested by applying the 3D information hypotheses 10' on regions or patches of the picture of the second view 12' and determining a difference between a transformed region of patch of the second view and the corresponding region of the picture of the first view.

Moreover, the 3D information determiner 8 may be configured to select, for each position of the first view, the further 3D information hypotheses of highest similarity or highest similarity measure 18'. Thus, with respect to FIG. 1b, there are two 3D information hypotheses of highest similarity measure 18, 18', derived from the picture of the first view 12 and the picture of the second view 12', respectively. Before performing the 3D information analysis it would be sufficient to have only one 3D information hypothesis of highest similarity measure 18 or 18', however, due to outliers, for example areas of the first view that are not shown in the second view or vice versa. Outliers may be caused due to an angular shift of the respective cameras. Furthermore, for example due to the different perspective of the respective picture of the first view and the picture of the second view, objects in the background may be hidden by objects in the foreground only in the first view or the second view. Therefore, since no stereo view is obtainable for these areas, 3D information hypotheses cannot be derived for these outlier and/or occlusion regions. Therefore, to obtain a reliable 3D information also for the outlier and/or occlusion areas, it is advantageous to calculate the 3D information hypotheses of highest similarity measure for the picture of the first view 12 and the picture of the second view 12' independently.

Therefore, a consistency tester 20 may be configured to mutually test whether the selected 3D information hypotheses 18 of the picture of the first view 12 and the selected further 3D information hypotheses 18' of the picture of the second view 12' fulfill a consistency criterion, thus indicating a positive test result. Using this consistency check, reliable information of the outlier and/or occlusion regions may be determined such that a reliable 3D information estimate can be determined for those areas at least based on the picture of one of the at least two views. In other words, the resulting 3D information hypothesis of highest similarity measure 18 and the further 3D information hypotheses of highest similarity measure 18', such as for example a depth/disparity map derived with respect to the picture of the first view and the picture of the second view, respectively, may be compared in order to determine inconsistent regions or regions, where a higher uncertainty with respect to the determined 3D information hypotheses exists. Based on this result, a consistency map may be derived. Based on this consistency map, it is possible to determine neighboring pixels or positions where hypotheses are most likely discarded (or rejected) and would therefore led to wrong seeds. A seed is considered to be a (rough) estimate or a starting point which may be determined from neighboring positions of the current position. The seed may be updated for example in a number of iterations based on the difference between pictures of a first view and a second view. If such a seed or hypothesis is known to be wrong, for example as indicated in the consistency map, the choice or selection of this hypothesis is penalized or even completely discarded.

According to embodiments, the iterative process leads to a finally updated depth/disparity map, i.e. a depth/disparity map that is a 'good' or converged representation of 3D information. This version of the depth/disparity map, being the result of an iteration, may then be used as a first pre-estimated depth/disparity map to start the iterative process in the following iteration.

According to embodiments, the consistency tester is configured to perform the mutual test (e.g. stereo consistency check) for an orientation of respective regions of the picture of the first view, having for each position, the selected 3D information hypothesis and wherein the picture of the second view having, for each position, the selected further 3D information hypotheses. Additionally or alternatively, the consistency tester may be configured to perform the stereo consistency check for center positions of respective regions of the picture of the first view having, for each position, the selected 3D information hypotheses and wherein the picture of the second view, having, for each position, the selected further 3D information hypotheses. The consistency tester may be further configured to obtain a consistency mask comprising a consistency measure for each position of the picture 26, wherein a high consistency measure indicates a deviation from selected 3D information hypothesis of the picture of the first view 12 from the selected 3D information hypothesis of the picture of the second view 12' at the respective positions of the picture of the first view and the picture of the second view as below a predefined threshold value and wherein a low consistency measure indicates the deviation as equal to or above a predefined threshold value.

In other words, the hypotheses provider may be configured for determining the 3D information hypotheses based on the consistency mask, wherein the hypotheses provider determines the 3D information hypotheses using 3D information estimates at positions having a higher consistency measure and wherein the hypotheses provider discards or penalizes 3D information based on a low consistency measure.

According to further embodiments, the pre-estimate or the further pre-estimate is a representation of the current picture from a preceding iteration having 3D information hypotheses for each position of the current picture determining, based on the selected 3D information hypotheses, for each picture from a preceding iteration of the current picture.

In embodiments, the pre-estimate or the further pre-estimate refers to a preceding picture of the current picture in a sequence of pictures having 3D information estimates for each position of the preceding picture. Further embodiments show the hypotheses provider configured for determining hypotheses for a first position of the positions of the current picture using a first statistical measure and for determining hypotheses for a second position of the positions of the current picture using a second statistical measure different from the first statistical measure. Thus, the hypotheses provider may be configured to (randomly) select neighbors, determine a mean or medium average of, for example two different neighboring pixels. According to further embodiments, the hypotheses provider is configured to determine at least one hypothesis of the hypotheses using a randomized neighborhood based on a statistical distribution of the 3D information estimates of the pre-estimate. Such a randomized neighborhood, for example a randomized neighborhood with an underlying uniform distribution or a randomized neighborhood with an underlying normal distribution may reflect, for example, a texture of the picture without having performed a separate or individual 3D picture analysis method.

Thus, only based on a distribution of similar 3D information hypotheses, for example weighted with the last determined similarity measure for each position, may lead to side information where good estimates for an information propagation from neighboring positions to the current position may be found. The hypotheses provider may be further configured to determine at most 10, at most 5, or at most 3 different information hypotheses in one iteration. In other words, in one iteration, each of the different 3D information hypotheses may be applied to the current picture of the first view to transform a region of the current picture of the first view into the picture of the second view and to determine a difference or an error between the transformed patch and the picture of the second view.

When referring to a position of the current picture usually a pixel of the current picture is referred to. However, the position of the current picture may be a set of pixels, such as for example a combination of four pixels of a square or nine pixels of a square.

For a trifocal arrangement, the same processing as described with respect to FIG. 1a and FIG. 1b may be applied to a third view with respect to one of the first or the second view. In detail, the hypotheses provider 4 may be configured for locally determining third 3D information hypotheses for positions of the current picture of a third view of the at least two different views on the basis of a third pre-estimate which associates the third 3D information estimate to each position of a picture of the first view. The picture may be the current picture of the first view of the previous iteration, the previously derived 3D picture or the previous picture of the first view. The similarity measure calculator 6 may for calculate, for each position of the current picture of the third view, a similarity measure for each of the third 3D information hypotheses of the respective position by measuring a similarity between a region of the current picture of the third view at the respective position and a corresponding region of the second view of the at least two different views located at a position displaced relative to the respective position by the respective 3D information hypotheses. The 3D information determiner may select, for each position of the third view, the 3D information hypothesis of the third 3D information hypotheses of highest similarity measure.

Figure 2A:
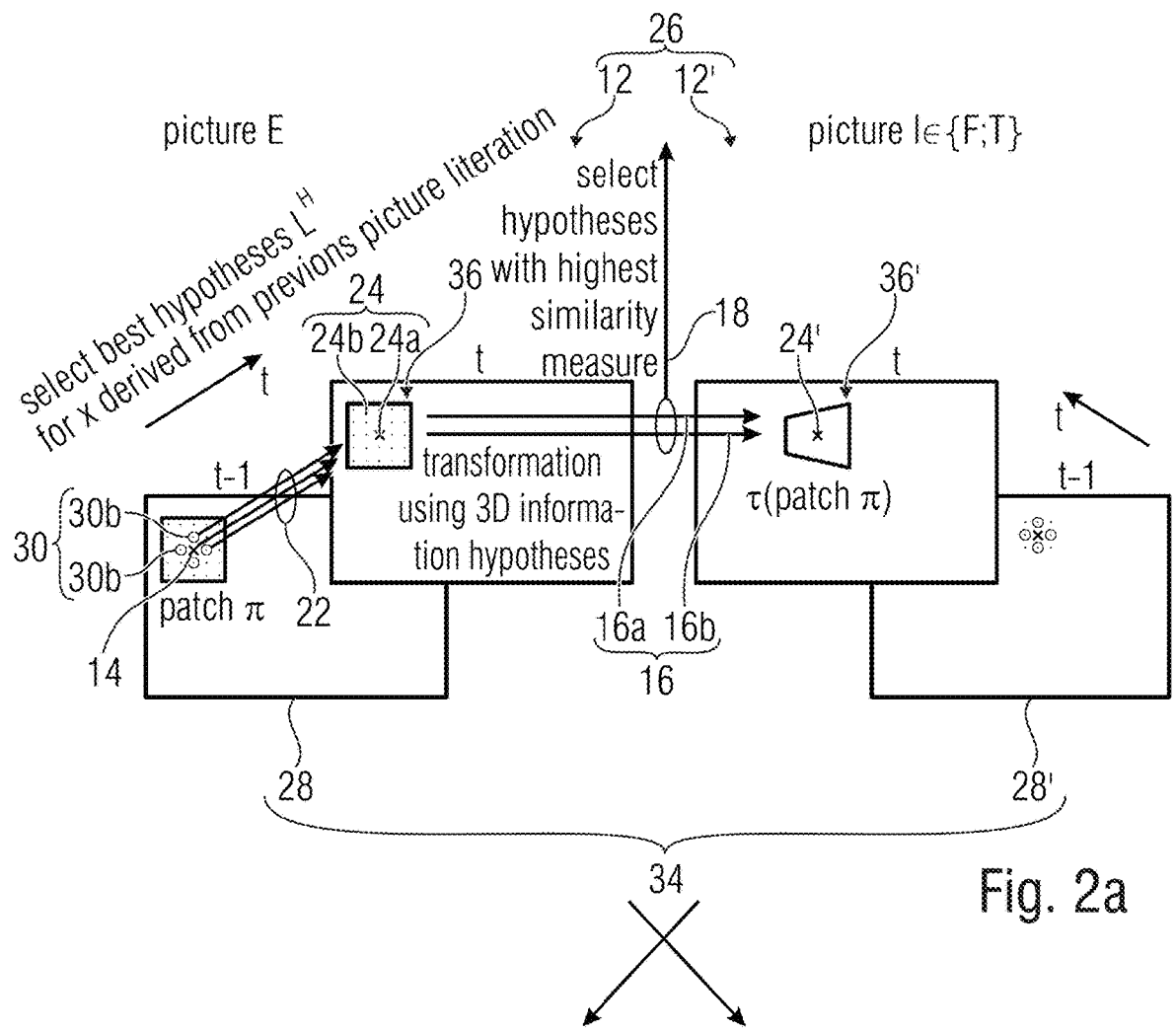
FIGS. 2a and 2b show a schematic block representation of the algorithm performed in the apparatus.

FIG. 2a shows a schematic representation of the underlying algorithm for performing 3D estimation. Herein, the hypotheses provider may be configured for locally determining 3D information hypotheses 22 for positions 24 of a current picture 26 of a first view 12 of the at least two different views 12, 12' on the basis of a pre-estimate 28 which associates a 3D information estimate 30, 30a, 30b to each position 24, 24a, 24b of a picture of the first view. The positions may be pixels or groups of pixels of the picture of a current view. The at least two different views 12, 12' may be derived from images of two different cameras such as a stereo camera, recording the same scenery from two different perspectives. Thus, both views at the same point in time present the same picture of the scenery, only recorded from different perspectives. The current picture 26 therefore comprises the current picture of a first view 12 and the current picture of a second view 12'. The same argument holds for the pre-estimate 28 and the pre-estimate 28' which may be a preceding picture of the first view or a preceding picture of the second view, respectively. As an additional or alternative embodiment, the pre-estimate 28 may be the calculated representation of the current picture of the first view 12 from a proceeding or an intermediate iteration for performing the 3D estimation. Therefore, the variable t indicates the current processing applied to the current picture wherein t−1 indicates a previous (and already performed) processing of the pre-estimate, which may be the current picture of a preceding iteration or a preceding picture such as a preceding frame of a series of pictures (e.g. a video). Thus, in case the pre-estimate is a preceding iteration of processing the current picture, the pre-estimate 28 may comprise an intermediate 3D information hypotheses for each position of the current picture of the first view which may be optimized or improved by the further iteration of the current picture of the first view.

After the 3D information hypotheses $L^{\mathcal{H}}$ are determined for a number of positions, such as for example for each position of the current picture 26 of the first view 12, for each position of the current picture (where 3D information hypotheses are available) of the first view a similarity measure 16 is calculated for each of the 3D information hypotheses of the respective position. Thus, a first hypothesis of the 3D information hypotheses may result in a similarity measure 16a and a second hypothesis of the 3D information hypotheses of the respective position results in the similarity measure 16b. The similarity is measured between a region or patch 36 of the current picture of the first view 12 at the respective position 24 and a corresponding region or patch 36' of the second view 12' of the at least two different views located at a position 24' displaced relative to the respective position by a respective 3D information hypothesis. The displacement may be mathematically described by the transfer function $\mathcal{T}$. Based on the calculated similarity measure 16a, 16b, the 3D information determiner may select, for each position 24 of the first view 12 the 3D information hypothesis 16 of highest similarity measure.

In general, the 3D information estimates for each position of the current picture are referred to with reference sign 30, wherein the list of 3D information hypotheses for one position of the picture are denoted with 30a, 30b. The same structure holds for the positions. Referring to all positions of the picture, reference sign 24 is used, wherein a single position is addressed by appending a letter such that a single position is referred to as 24a, 24b. Thus, 24a and 24b may refer to a pixel or discrete point in the current picture, wherein 30a, 30b may refer to the corresponding 3D information hypotheses.

Figure 2B:
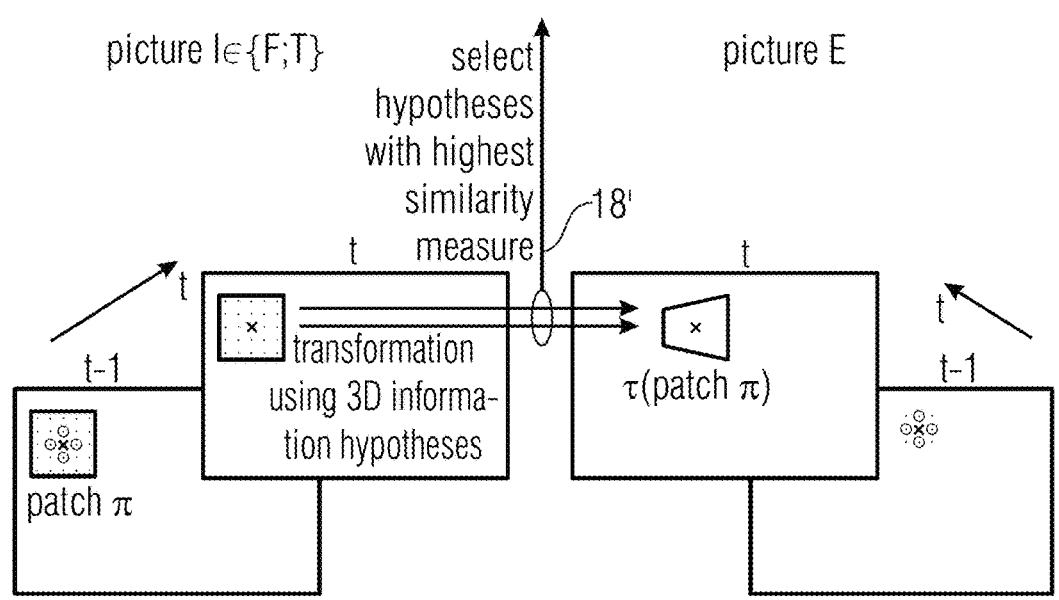

FIG. 2b shows the same algorithmic procedure, however, herein the 3D hypotheses are derived for the picture I and the similarity measure is derived with respect to picture E. Picture I is a short notation for the set of picture F and picture T. In the bifocal case, the calculation is only performed on the picture of the first view E and the picture of the second view F. However, in the trifocal case, the same processing as applied to the second view F is applied to the picture of the third view T.

Performing the 3D information hypotheses determination twice, once for picture of view E with respect to picture of view I and once for picture of view I with respect to picture of view E, enables the consistency tester 20 to perform a consistency check on the selected 3D information hypotheses of highest similarity measure 18, 18'. On the one hand, since both 3D information hypotheses of highest similarity measure should be equal (a single depth/disparity map was calculated for the picture based on two different views). A consistency tester 20 may be configured to provide a stopping criterion to the apparatus indicating that the 3D information hypotheses for the picture of the first view and the second view are equal or at least similar and therefore deemed to be equal. Thus, no further iteration has to be performed on the current picture and therefore saving computational power. This would be a dynamic approach with a stopping criterion instead of a static approach, where e.g. a fixed number of iterations is performed for each frame or picture regardless of the actual quality of the 3D information hypothesis. Moreover, the consistency tester may reveal areas in the picture of the first view or the picture of the second view, which are not covered by the respective other view due to an occlusion of the area or since areas are outlying of the viewing angle of one the views. Based on this consistency information the determined hypothesis for the respective area may be updated in one or more further durations.

The same algorithm may be applied to a trifocal case, meaning that one picture comprises three different views, for example E, F, T, while the stereo processing is applied to the first and the second view and independently to the second and the third view. Thus, two different pictures comprising the 3D information hypothesis for each pixel may be determined, or, in other words, two different depth/disparity maps are calculated for the current picture. Using this information, it is not necessary to have further a priori knowledge to the orientation or the displacement of the two cameras recording the first and the second view to derive a 3D picture from the two calculated depth/disparity maps.

Figure 2C:
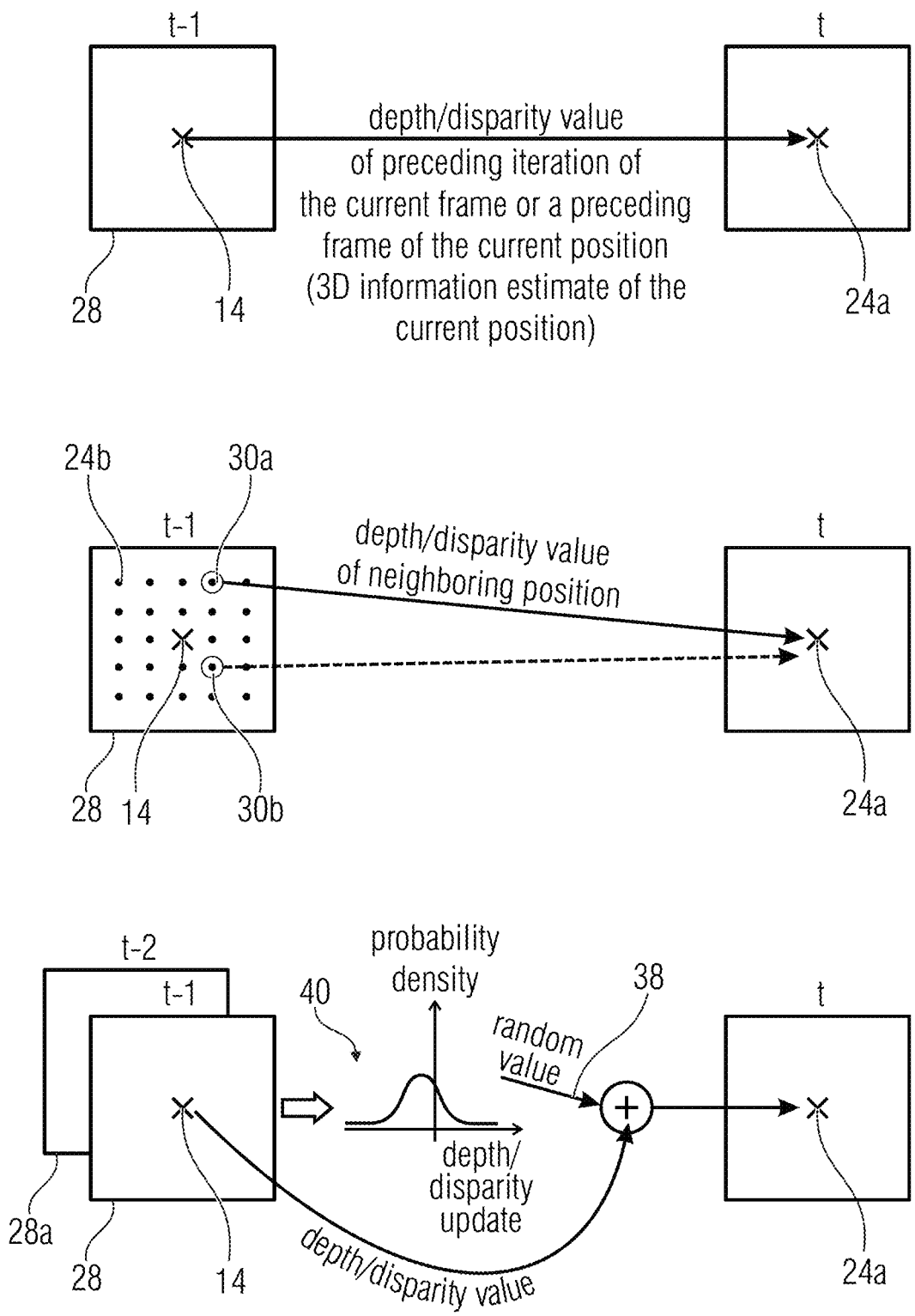
FIG. 2c shows schematic hypotheses propagation schemes used to build a list of hypotheses for a current position of a current picture.
Figure 4:
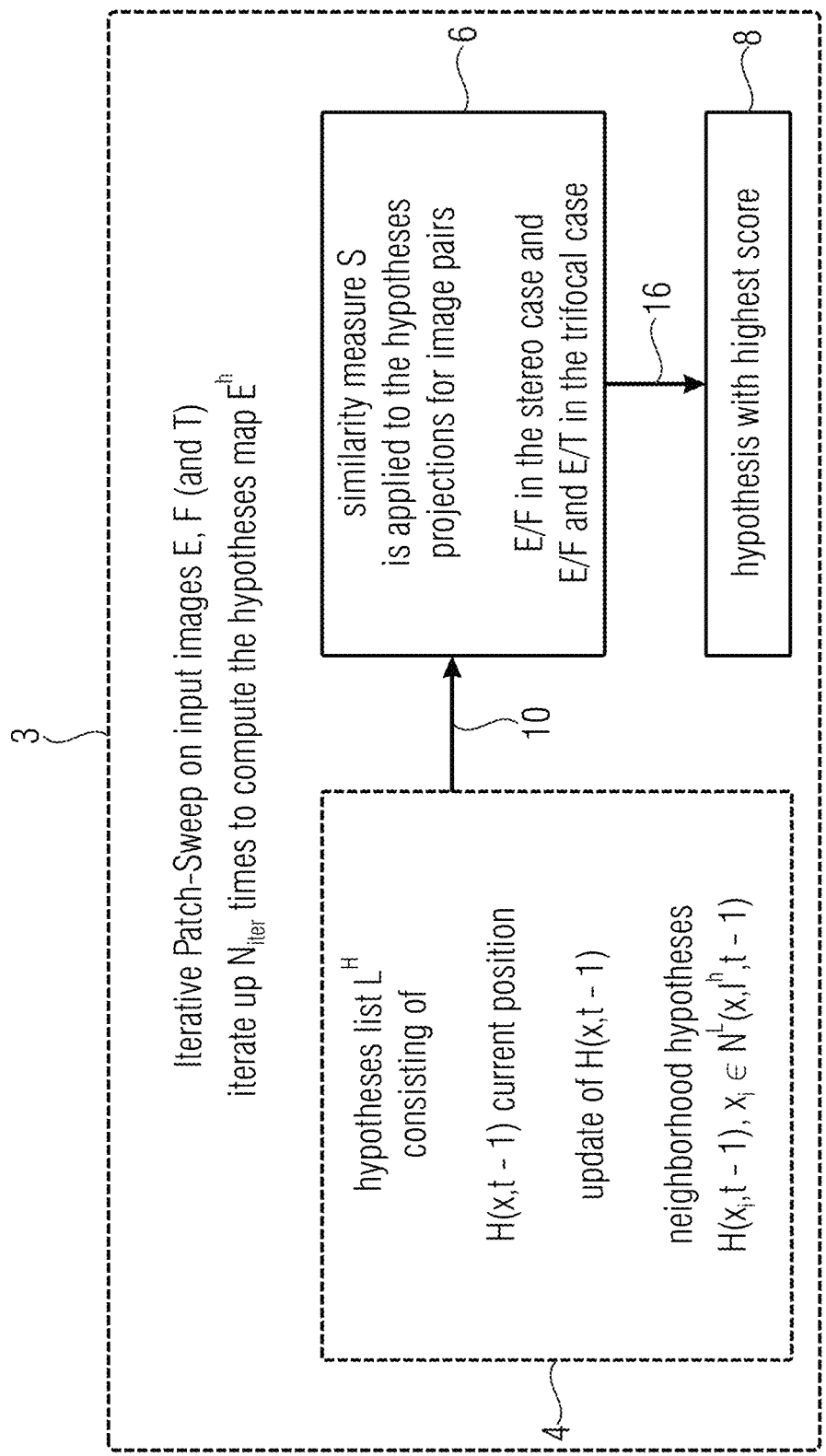
FIG. 4 shows a schematic more detailed flowchart of the operations performed in the topmost boxes of FIG. 3 that is indicating an algorithmic structure for selection, the update and the evaluation of hypotheses in case of a stereo or trifocal camera configuration.

FIG. 2c shows an overview of possible hypotheses selection (first and second picture) and hypotheses update (third picture) algorithms according to the listing of box 4 in FIG. 4. In the first picture of FIG. 2c, it is illustrated that the 3D information estimate of the current position is directed from the preceding picture or the preceding iteration of the current picture to the current iteration of the current picture. The second picture illustrates randomly selecting neighboring 3D information estimates from the pre-estimate such that information from neighboring positions is distributed or propagated to surrounding positions. Furthermore, the third picture illustrates the hypotheses update. Based on the probability density function 40, a random update value is calculated and added to the 3D information estimate (cf. first picture of FIG. 2c) to update the same in order to derive one further 3D information hypothesis. If more than one further hypothesis shall be generated, the procedure may be repeated with a further random update value. As illustrated, the probability density function may be derived from preceding depth and/or disparity update values. Alternatively, a general model may be assumed which may be applied to any sequence of pictures.

FIG. 3 shows a schematic block diagram from a non-specific perspective. Herein, iterative patch sweep blocks 3a and 3b may comprise the function blocks as described in FIG. 1a. Furthermore, consistency tester 20 may perform a stereo consistency check for the picture of the first view 3a, for example view A, and the picture of the second view 12', for example view F both accompanied with the 3D information hypotheses of highest similarity measure 18, 18' for each pixel or each position. This is considered to be the stereo consistency check as shown on the left and FIG. 3. Thus, the block diagram on the left of FIG. 3 may be a general representation of the embodiment shown in FIG. 1b.

In the right diagram of FIG. 3, the trifocal consistency check 20' is indicated. Compared to the stereo consistency check, the trifocal consistency check further comprises a picture of the third view accompanied by the 3D information hypotheses of highest similarity measure for each pixel or position 18". To be more precise, the picture of, as indicated in FIG. 3b, for example the second view may be accompanied with two different 3D information hypotheses of highest similarity measure, one hypothesis determined to the relation to the picture of the first view and one hypothesis determined to the transformation to the picture of the third view. Thus, the trifocal consistency check may be performed of two stereo consistency checks, namely, a consistency check for the picture of the first view, in this case F, with respect to the picture of the second view, in this case E, and furthermore a stereo consistency check may be applied to the picture of the second view and the picture of the third view, in this case T.

In other words and according to embodiments, the algorithmic components are structured as illustrated in FIGS. 3 and 4. While FIG. 3 provides a high level overview to the processing blocks for stereo and trifocal camera configurations and the subsequent consistency checks 20, 20', FIG. 4 is devoted to a more detailed illustration of the Iterative Patch-Sweep procedure. The main idea for 3D estimation is the iterative evaluation and update of spatial patches in order to approximate the depth and the normal of the real object surface for each pixel of image E. As the patches are estimates to the real surface, they are also referred as hypotheses in order to reflect their uncertain character. For each iteration and each pixel coordinate $x \in \Omega_E$ a list of hypotheses $L^{\mathcal{H}}$ is assembled consisting of the hypothesis for the current position $\mathcal{H}(x, t-1)$ from the previous iteration, the hypotheses from a spatial neighborhood of the current position from the previous iteration and an up-date of $\mathcal{H}(x, t-1)$.

In order to allow for an efficient parallelization, the selection of the spatial neighborhood and the hypotheses update is strictly performed on pixel level without any global algorithmic interaction. Here, the concrete choice of the hypotheses update rule and the spatial neighborhood selection constitute the functional efficiency of the iteration procedure.

Despite the iterative sweep does not comprise a global optimization criterion as with techniques like belief propagation, graph cuts or variational approaches the application of the local operations on pixel level leads to comparable information propagation in the course of each iteration. Once $L^{\mathcal{H}}$ 22 is assembled, all hypotheses are evaluated by comparing the patch projections on the images E and F with respect to a similarity measure S. The hypothesis with the highest score is selected as new result. In the trifocal case, additionally the projections for the image pair E and T are evaluated and the best result for both stereo pairs is selected. Optionally, a consistency check for outlier and occlusion detection is applied as illustrated in FIG. 3.

Here, a consistency map is generated. It is based on the cross-check 20 of results for the symmetric estimations, i.e. for the pair E and F in the stereo case and in the trifocal case additionally for the pair E and T. Once the hypotheses 22 are computed for two images the corresponding estimates are compared according to the patch orientation and the distance of the patch centers. A hypothesis is considered to be consistent, if both values are below predefined thresholds $T_c$ and $T_\alpha$. In case of a trifocal camera configuration a hypothesis is marked as consistent, if either the crosscheck with the estimation for F and E or for T and E is successful. The resulting consistency map can be used to reject inconsistent hypotheses after each iteration or to hinder their propagation and to penalize their selection. Additionally, considering post processing of 3D data in terms of filtering or the fusion of multiple perspectives for view synthesis, the consistency map constitutes a valuable cue for the reliability of hypotheses.

FIG. 4 shows a more detailed insight in the algorithmic structure of the iterative patch sweep blocks 3, which may also be seen as an alternative to the description of FIG. 1a and FIG. 1b. Thus, FIG. 4 illustrates that the hypotheses provider 4 may provide the hypotheses in a list $L^{\mathcal{H}}$ formed by at least one of the current positions of a previous image or a previous iteration, the update of the selected hypothesis of the current pixel position using the similarity measure derived from the preceding iteration, and determined neighboring selected 3D information hypotheses based on one of the described neighborhoods. Thus, as described with respect to FIG. 1b, the similarity measure calculator 6 may determine a similarity measure for each of the hypotheses of list $L^{\mathcal{H}}$ 22 in the stereo case. Furthermore, for one of the pictures of the views in the trifocal case, for example the view of the camera allocated in the center of the three cameras, 3D hypotheses are determined for both, the transform to the picture of the first other view and the transform of the picture of the second other view. Thus, in the trifocal case, two depth/disparity maps may be calculated, one with respect to the first and the second view, and one with respect to the second and the third view. Having two different depth/disparity maps, an overall 3D information estimate or an overall disparity/depth map may be calculated for the current picture without an exact knowledge of the respective camera positions.

The depth/disparity maps may be calculated or determined by the 3D information determiner 8 selecting, for each pixel or position of the pictures of each view, based on the 3D information hypotheses of highest similarity measure for each pixel opposition. To clarify, even though the 3D information hypotheses are calculated for each view independently, the resulting 3D information hypotheses of highest similarity measure, for example after the last iteration, may be equal or at least assumed to be equal for pictures of two different views, for example of two neighboring views in the trifocal case, or both views in the stereo case since the pictures of the different views converge.

The following sections are devoted to the individual algorithmic components as illustrated in FIG. 4. Therein, details about the hypotheses generation and update are provided. Beside the formal derivation of deterministic hypotheses updates, a randomized update model based on scene statistics is introduced. In addition to the patch-based representation of hypotheses that includes normal and depth information, simplified representations consisting of depth or disparity only are discussed. Depending on the concrete hypotheses representation, customized flavors of the algorithm can be derived that reflect application specific requirements regarding the computational demand for the algorithm and the completeness, smoothness and accuracy of the results. Furthermore, the selection of the spatial neighborhood from the previous iteration is discussed. It has a great impact on the overall algorithmic performance regarding convergence rate and quality. Thus a change of neighborhood selection can be considered as the application of a different iteration scheme in terms of the propagation of the involved hypotheses. Afterwards, a multi-scale approach is formulated that greatly reduces the computational load and improves the rate of convergence, especially in case of high resolution video input. Finally, based on an empiric evaluation of real world datasets an analysis of the rate of convergence for the Iterative Patch-Sweep is provided.

Patch Quantization

A patch Π is sampled in image E according to a parameter for its edge length $e_p$ in pixel and a parameter $e_s$ for the number of samples in x- and y-direction. Constitutively, the applied spatial representation as discussed in the following determines the sampling coordinates in 3D. Here, the patch samples are denoted as $$S^n = \{X_0^\pi, \ldots, X_{e_s-1^2}^\pi\} \qquad (1)$$

Hypotheses Update

In this section the theoretical background for the update of hypotheses is covered in order to enable for an understanding of the functional efficiency of the algorithm. As illustrated in FIG. 4, the hypotheses update is the only operation that can lead to new hypotheses, while the other operations are dealing with the propagation of temporal predecessors from a spatial neighborhood that was computed in the previous iteration. Therefore, in a worst case scenario, where the depth/disparity map of the picture has the same value for each position, e.g. the depth map is all one, the hypotheses update is the only possibility to generate a depth map that comprises values different from one.

During the iterative sweep, the hypotheses updates are conducted based on random samples that are computed with respect to a suitable statistic. In the following, a formulation for numeric optimization is derived that can be used to compute deterministic hypotheses updates. While the optimization may be computationally inefficient compared to the randomized approach, it will serve for the evaluation of the hypotheses update statistic and for the justification of the randomized approach. Regarding hypotheses update three different flavors of hypotheses with varying expressiveness about the 3D object surface have been numerically investigated. As listed in FIG. 5, the investigated hypotheses consist of depth and normal orientation, depth only and disparity only. In case of depth only hypothesis two different variants are evaluated. While DE denotes a coordinate transformation of an image patch, DEP respects the perspective distortion caused by patch projections that are conducted with the respective camera data.

Preparative to the evaluation of the individual hypotheses representations, a generic optimization target for arbitrary parameterizations is formulated. Let $p_E=(x_0, \ldots, x_{N-1})^T$, $x_i \in \Omega_E$ the set of patch discretization coordinates in the image space of E and $\mathcal{T}: \Omega_E \times \mathbb{R}^M \to \Omega_I$ the image coordinate transformation between the image plane of E and $I \in \{F,T\}$ where $p=(p_0, \ldots, p_{M-1})$ is the parameter set for the representation of a single hypothesis. A valid hypothesis would minimize the similarity measure S evaluated for the transformed image coordinates. Therefore, a generic criterion for hypotheses optimization is given by $$\min_p \{S(E(\rho_E), I(\mathcal{T}(\rho_E, p)))\} \quad (2)$$

with short notations $E(\rho_E):=(E(x_0), \ldots, E(X_{N-1}))^T$ and $\mathcal{T}(\rho_E, p):=(\mathcal{T}(x_0, p), \ldots, \mathcal{T}(x_{N-1}, p))^T$. Based on Equ. 2 an optimization procedure can be formulated. Let $\mathcal{T}(x, p):=(\mathcal{T}_x(x, p), \mathcal{T}_y(y, p))$, then the partial derivatives of the optimization target are given by $$\frac{\partial S}{\partial p_i} = \frac{\partial S}{\partial I}\left(I_x \frac{\partial \mathcal{T}_x}{\partial p_i} + I_y \frac{\partial \mathcal{T}_y}{\partial p_i}\right) \quad (3)$$

with the partial derivatives of image I in x- and y-direction $$I_x = \frac{\partial I}{\partial \mathcal{T}_x} \text{ and } I_y = \frac{\partial I}{\partial \mathcal{T}_y}.$$

Consequently, the desired numeric minimization can be formulated as $$p^{n+1} = p^n - \lambda\left(\frac{\partial S}{\partial p_0}, \cdots, \frac{\partial S}{\partial p_{M-1}}\right) \quad (4)$$

where $\lambda$ denotes an anisotropic weighting matrix for the parameter update. Based on Equ. 4, in the following a concrete parameter update is formulated for each hypotheses representation listed in FIG. 5. Afterwards, an evaluation is conducted for each parameter update formulations. Here, the sum of squared differences (SSD) is used as similarity measure for parameter update iteration. It is apparent that not only the SSD can be used as a measure for assessing the similarity, but also a sum absolute differences, the cross-correlation or any other function that takes into account number and amount of differences and, for instance, sums up pixel-wise determined deviations between the mutually displaced regions. Regarding patch orientation, the coordinate system and camera model conventions defined in [45] are presumed. Let $P_E=(K_E|0)$ and $P_I=K_I(R_I|t_I)$. The normal $n_{fp}$ of a fronto parallel patch with respect to $P_E$ is oriented towards the camera, i.e. $n_{fp}=(0,0,-1)^T$. Likewise, a valid normal of an estimated patch needs to exhibit a negative third component. A normal parameterization used for optimization has to reflect the valid orientation directions.

In this context a mapping $n(a, b): \mathbb{R}^2 \to \mathbb{S}_l^2$ onto the lower hemisphere is used as $$n(a,b) = (a \cdot n_z, b \cdot n_z, n_z)^T, \text{ where } n_z = -\frac{1}{\sqrt{a^2+b^2+1}} \quad (5)$$

Disparity Update (DI): In case of rectified stereo images, numeric optimization can be conducted in the disparity space. From the perspective of the Iterative Patch-Sweep it can be considered as a parameterization of fronto parallel patches in the disparity domain. Especially, for application scenarios that are restricted to a stereo camera configuration and disparity results, the algorithmic complexity is reduced due to the simple transfer function $\mathcal{T}(x, \eta)=x+(\eta, 0)^T$ and the single component parameter vector $p=(\eta)$. Regarding Equ. 4 the parameter update reads as $$\eta^{n+1} = \eta^n + \lambda \sum_{x_i \in \rho_E} 2 \cdot (E(x_i) - I(x_i + (\eta, 0)^T))I_x$$

Depth Update (DE): If the estimation of depth for general camera configurations may be used, from a computational perspective, DE is the least expensive approach among the listing in FIG. 5. The coordinate transfer is similar to DI. The spatial patches are considered to be fronto parallel with respect to camera $P_E$. While the patch center $x_{pc} \in \Omega_E$ transformed with respect to the depth parameter $p=(Z)$, the combined patch transfer does not reflect a perspectively correct projection. Instead, based on the matrix $H(Z)=K_I(R_I-t_I n_{fp}^T/Z)K_E^{-1}$, the patch transformation is performed with respect to the offset from the patch center according to $\mathcal{T}(x, Z) = \mathcal{M}_{H(Z)}(x_{pc})+(x-x_{pc})$. Regarding Equ. 4 the parameter update reads as $$Z^{n+1} = Z^n + \lambda \sum_{x_i \in \rho_E} 2 \cdot (E(x_i) - I(\mathcal{T}(x_i, Z)))\left(I_x \frac{\partial \mathcal{T}_x}{\partial Z} + I_y \frac{\partial \mathcal{T}_y}{\partial Z}\right) \quad (7)$$

where $\mathcal{M}_{H(Z)}(x_{pc})$ denotes the mapping of one pixel, point or position of one image plane into another image plane. Therefore, the point, e.g. $x_{pc}$ representing the patch center, may be homogenized. Furthermore, the homographic transformation H(Z) may be performed on the homogenized point, before a de-homogenization is applied.

Depth Update with perspectively correct Matching (DEP): In contrast to DE, perspectively correct patch transfer is included. While the parameter vector and H(Z) remain identical compared to DE, the transfer function is defined as a perspective mapping for all patch coordinates as $\mathcal{T}(x, Z) = \mathcal{M}_{H(Z)}(x)$. According to Equ. 4 the parameter update is performed as in Equ. 7, but with the modified transfer function $\mathcal{T}(x, Z)$.

$$Z^{n+1} = Z^n + \lambda \sum_{x_i \in \rho_E} 2 \cdot (E(x_i) - I(\mathcal{T}(x_i, Z)))\left(I_x \frac{\partial \mathcal{T}_x}{\partial Z} + I_y \frac{\partial \mathcal{T}_y}{\partial Z}\right) \quad (7.1)$$

Depth and Normal Update with perspectively correct Matching (DEPN): The estimation of the patch normal is carried out based on perspectively correct matching. DEPN is the most comprehensive surface patch representation that is listed in FIG. 5. The estimation of normals enables for a better surface representation during the matching procedure and allows for realistic shading during the rendering process. According to the normal parametrization of Equ. 5 the parameter vector reads as p=(a, b, Z). The possibility of varying normal needs to be included into the transfer function. With $X_{pc} = \Pi_{P_E}(x_{pc}, Z)$, n:=n(a, b) and d:=$\langle X_{pc}, n \rangle$, the matrix $H(a, b, Z) = K_I(R_I - t_I n_{fp}^T/Z) K_E^{-1}$ enables for the definition of the transfer function $\mathcal{T}(a, b, Z, x) = \mathcal{M}_{H(a,b,Z)}(x)$. The update of depth and normal parameters is carried out according to Equ. 4 as $$p^{n+1} = p^n + \lambda \sum_{x_i \in \rho_E} 2 \cdot (E(x_i) - I(\mathcal{T}(x_i, Z)))(I_x, I_y) \begin{pmatrix} \frac{\partial \mathcal{T}_x}{\partial a} & \frac{\partial \mathcal{T}_x}{\partial b} & \frac{\partial \mathcal{T}_x}{\partial Z} \\ \frac{\partial \mathcal{T}_y}{\partial a} & \frac{\partial \mathcal{T}_y}{\partial b} & \frac{\partial \mathcal{T}_y}{\partial Z} \end{pmatrix}. \quad (8)$$

In the described formulas, p denotes the parameter vector representing the selected 3D information hypothesis or the 3D information estimate for a current position, Z the depth representing the selected 3D information hypothesis, n the current iteration, $\lambda$ an isotropic weighting matrix, $x_i$ the current position, $\rho_E$ the positions of the current picture of the first view E, E the picture of the first view, I the picture of the second view, $I_x$ the partial derivative of the picture of view I in x-direction, $I_y$ the partial derivative of the picture of view I in y-direction, and $\mathcal{T}$ denotes a correlation slice of a tensor element representing the displacement of the positions of the picture of the first view relative to the respective positions of picture of the second view by the respective 3D information hypotheses.

Justification of Randomized Hypotheses Updates by Empiric Evaluation: A statistical analysis of the parameter updates that are generated with respect to the derived numeric parameter update iterations is conducted for a variety of test datasets. The goal is to provide a valuable insight for the design of a fast randomized update procedure. Exemplary, an empiric evaluation of the parameter updates for the Oliver1 dataset is presented.

Figure 6:
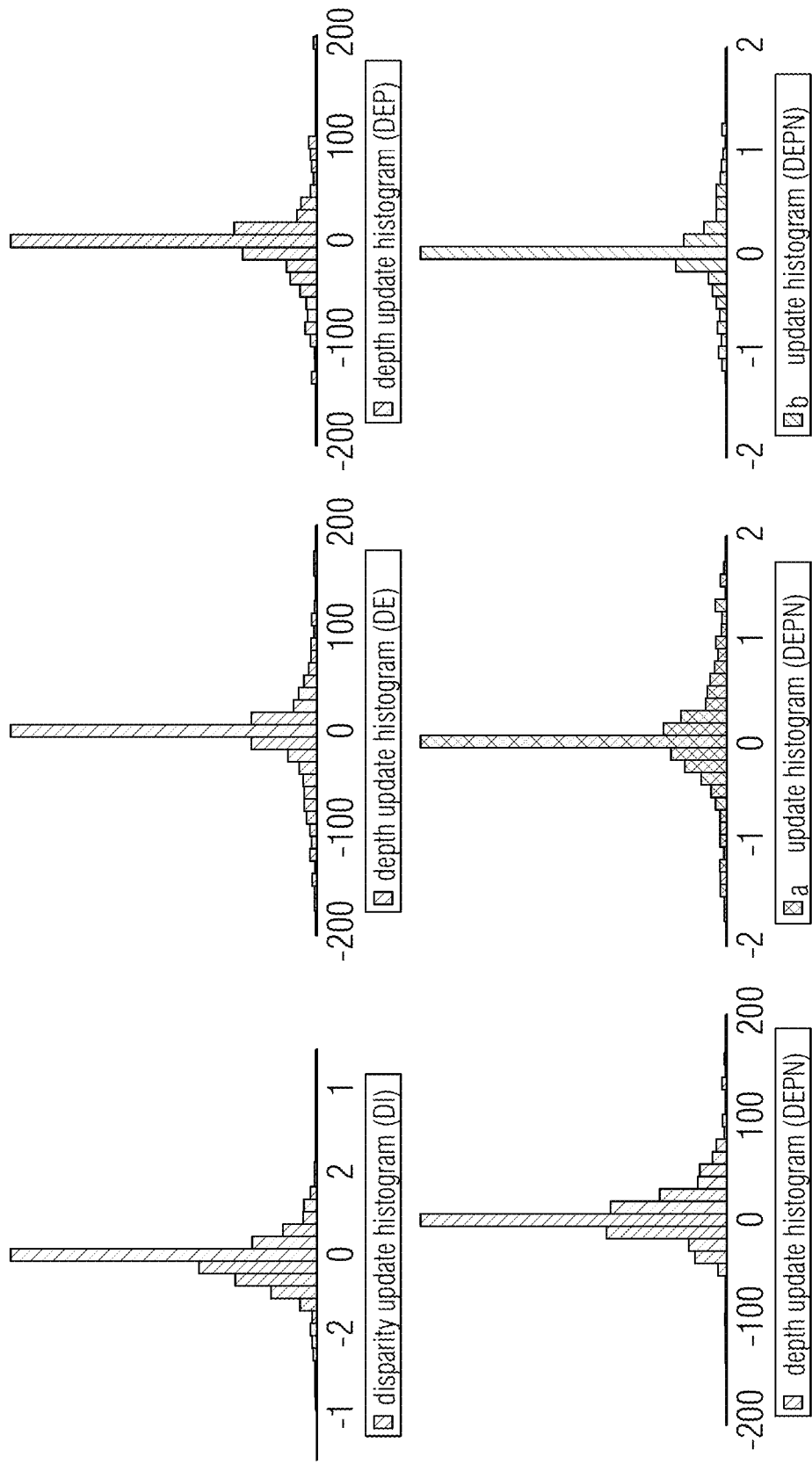
FIG. 6 shows a schematic bar diagram indicating a distribution of numerically optimized update values for different hypotheses parameterizations.

An illustration of the update values, i.e. $\lambda^{-1}(p^{n+1} - p^n)$, for the four different hypotheses representations is provided in FIG. 6. In order to focus on the successful updates, the histogram representation only includes values that are considered superior to the propagated hypotheses (c.f. FIG. 4). It can be seen that the distributions of all parameter updates are Gaussian with approximately zero means and individual variance values. Although FIG. 6 shows statistics for only one dataset, very similar distribution properties can be observed throughout all evaluated datasets. In consequence, the occurrence of the various parameter updates can be modelled by means of a Normal Distribution with zero mean and a content specific variance.

While the numeric iteration can be used for parameter update, in practice the downside of this approach is a significant computational demand for function evaluation. As the Iterative Patch-Sweep performs temporal propagation of spatially neighboring hypotheses, an individual update value does not need to be linked exactly to the local texture values as with the iterative optimization. Instead, the parameter update only needs to respect the evaluated statistics in order to generate enough hypotheses seed values that can be propagated within a local neighborhood. In consequence, the validity of a randomized approach for parameter update can be empirically justified. As fast random number generators on GPUs like the cuRAND library [46] are able to generate several giga samples of random values per second, a randomized approach is not only sound from a theoretical perspective, but also practical for real-time implementations.

Hypotheses Propagation

Referring to FIG. 4, for each iteration, several hypotheses of a spatial neighborhood are evaluated, which have been produced in the previous iteration together with the updated hypothesis of the current location. In contrast to other state of the art algorithms that aim is the minimization of a global optimality criteria consisting of a data term and a smoothness term like graph cuts, belief propagation or variational techniques. Although the proposed approach has a global character in terms of information distribution, there is no global guidance included. Instead, there are local decision rules for information propagation and result selection. Especially, the selection of the spatial neighborhood determines how hypotheses are propagated within the image plane and has a great impact on the algorithmic behavior in terms of quality of the results and the rate of convergence. Formally, a spatial L-neighborhood of $x \in \Omega_I$ in the hypotheses image $I^h$ at time t is a set of L hypotheses with respective image coordinates defined as $$\mathcal{N}^L_{(x,I^h,t)} := \{I^h(x_0, t), \ldots, I^h(x_{L-1}, t) | x \neq x_i\} \quad (9)$$

There is an infinite number of L-neighborhoods that can be chosen for the iteration procedure. Two different families of L-neighborhoods are investigated and evaluated in terms of quality of results. For an illustration, please refer to FIG. 7. A discussion regarding the rate of convergence is provided below. The first kind of L-neighborhoods is based on a deterministic preselection of involved coordinates according to a regular pattern. The second family is founded on a probabilistic selection of the neighborhood coordinates. An impression of the propagation behavior for the different neighborhoods is provided in FIG. 8. Here, intermediate results for the randomized neighborhood and for the deterministic neighborhood are illustrated.

Deterministic Spatial Neighborhood: Many definitions of regular spatial neighborhoods can be found in literature. In order to provide a complete algorithmic description, the notation and definition are briefly reviewed. As illustrated in FIG. 7, the neighborhood formation happens in a regular manner. Two different deterministic spatial neighborhoods are evaluated. They mainly serve as a reference for the evaluation of the competing approach that is based on a randomized neighborhood selection. The definition of the investigated L-neighborhoods for the deterministic case is given by a listing of a fixed set of neighboring coordinate values as follows $$\mathcal{N}^4_{(x,I^h,t)} := \{I^h(x+1,y),t), I^h((x,y-1),t), I^h((x-1,y),t), I^h((x,y+1),t)\}. \quad (10)$$

$$\mathcal{N}^8_{(x,I^h,t)} := \{I^h(x_i,t) | x_i \in \{\{x,x+1,x-1\} \times \{y,y+1,y-1\}\} \setminus \{x,y\}\}. \quad (11)$$

The potential propagation path length for each iteration is exactly one with respect to the metric that is induced by the selected neighborhood. $\mathcal{N}^4$ for instance induces the Manhattan distance, while $\mathcal{N}^8$ induces the Chebyshev metric. Hence, for a diagonal propagation an iteration based on $\mathcal{N}^4$ may use two cycles, while $\mathcal{N}^8$ based iterations may use only one cycle. In consequence, regarding the analysis of the algorithmic efficiency in terms of information propagation, the rate of convergence is directly linked to the choice of the spatial neighborhood that underlies the iteration procedure.

Randomized Spatial Neighborhood: In contrast to deterministic spatial neighborhoods the main idea of a randomized neighborhood is the assembly of an individual neighborhood for each pixel coordinate and each iteration based on probability distributions. As illustrated in FIG. 7, the neighborhood definition consists of likelihood for each coordinate position and a fixed number of samples $r_x$ that are drawn randomly according to the underlying probability density function. Regarding the propagation path properties of a randomized neighborhood, in theory there is no limit on the distance that can be covered within the course of a single iteration. The possible propagation distance is directly coupled to the selected probability distribution. A uniform distribution for instance, precisely restricts the potential distances while a normal distribution allows for arbitrary propagation across the image plane. Both distributions are applied together with different distribution parameters. In order to identify the most beneficial configuration for probability function and respective parameters, both distributions are evaluated below according to their impact on the rate of convergence. Additionally, a comparison with the deterministic neighborhood is conducted. While a probability function only characterizes the nature of a neighborhood, additionally an optimal number of random samples $r_x$ are determined that are subject to evaluation.

Multi-Scale Sweep

As illustrated below, it is possible to increase the rate of convergence of the Iterative Patch-Sweep by the application of a multi-scale strategy. With increasing image dimensions, the hypotheses propagation path lengths potentially expand. Depending on the selected spatial neighborhood, an increased path length directly leads to additional iterations for hypotheses propagation. In order to speed up the propagation process, a number of sweep levels $L\_sweep \geq 0$ are defined together with a level scale factor $0 < s_{lev} < 1$. For each level, scaled versions of the input images are computed with dimensions $w \cdot s_{lev}^l$, $h \cdot s_{lev}^l$, where w and h are the width and the height of the original images and $l \in [0, \ldots, L_{sweep}]$ denotes the sweep level. Then the iterative sweep is applied to each level in descending order, i.e. from the smallest image dimensions to the greatest. For each level, the resulting hypotheses map is scaled by $$\frac{1}{s_{lev}}$$

and propagated to the next lower level as an additional hypotheses input for the iterative sweep.

Compared to the other sweep levels, level 0 and level $L_{sweep}$ are handled differently. On sweep level $L_{sweep}$ no results from higher levels are available and the iterative sweep is conducted as without the multi-scale strategy. On level 0 there is no lower sweep level and the output constitutes the final result. A detailed analysis of the impact of the multi-scale approach to the rate of convergence is outlined below.

In other words, the apparatus may perform an iteration of the 3D estimation on a representation of the picture of the first view downscaled with a first scaling factor and to perform the further iteration on a representation of the picture of the first view scaled with a second scaling factor, wherein the first scaling factor is greater than the second scaling factor.

Rate of Convergence

As the iterative sweep exhibits no global optimization criterion, a converged state is not directly linked to a single numeric threshold. However, the analysis of algorithmic characteristics during the iteration procedure allows for the derivation of an empirically motivated convergence criterion. First, the relevant parameters have to be identified. Regarding the algorithmic structure illustrated in FIG. 4, there are two operations that can affect convergence. These operations are the update and the propagation of hypotheses. The efficiency of hypotheses up-date is directly linked to the update acceptance rate. The more updates are accepted the more seeds are generated and subsequently propagated. In this context, a hypothesis is considered as seed, if it is generated during certain iteration or injected as a predecessor from the previous frame and remains at its position until convergence. Here, the update of a hypothesis does not terminate its seed status, but the seed status is eliminated if the hypothesis is replaced by a propagated value. Please note that this procedure leads to a definition of seeds that can include wrong hypotheses. However, this does not contradict the objective since the conducted analysis is about convergence and not about correctness. The performance of the propagation operation can be expressed in terms of needed iterations for forwarding the seed hypotheses to all relevant positions. In combination, it is desirable to achieve a high seed generation rate and a small propagation path length according to the selected neighborhood.

Figure 9:
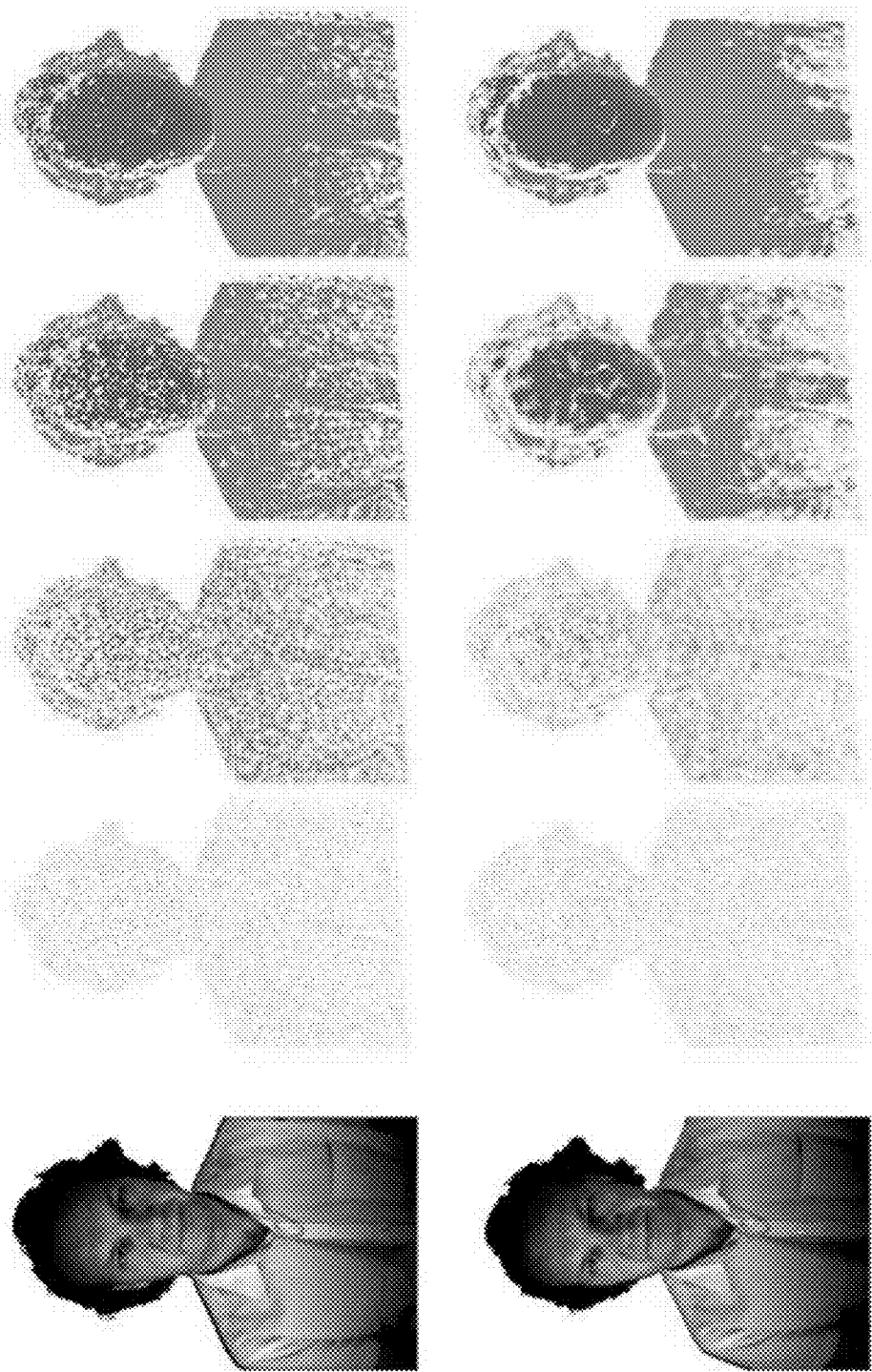
FIG. 9 shows a schematic representation of two views of the Oliver1 dataset as an example for the stereo input and intermediate results after iterations 1, 3, 6, and 10, wherein on the left, the stacked input images of the stereo view are shown and wherein in the top row the iteration with a deterministic 4 neighborhood and in the bottom row iterations with a randomized neighborhood and a number with random samples $r_s=4$ is shown.

In order to formulate a convergence criterion on basis of these requirements, the mean propagation path length and the seed generation rate are empirically evaluated. In FIG. 9, an empiric example for the fraction of accepted hypotheses updates, the cumulated fraction of seed values and the mean propagation path length is plotted for five frames of the Oliver1 dataset with 30 iterations for each frame. The intermediate results for the deterministic neighborhood illustrated in the top row of FIG. 8 correspond to the first frame in FIG. 9. In order to illustrate the asymptotic behavior of the measured values, the number of iterations is chosen much higher than may be used for a converged state and a stable result. Here, the hypotheses update fraction refers to the ratio of accepted hypotheses updates and the overall amount of processed pixel positions. The cumulated seed value fraction is the fraction of hypotheses that keep their seed status from the current iteration until convergence. The mean propagation path length denotes the average iteration distance as described above. Although the plots reflect results for a certain dataset, the shapes of these graphs and especially their asymptotic behavior remain almost constant for all evaluated datasets. Apparently, regarding the first frame, all three graphs are different compared to the consecutive frames. The reason for this deviation is the effort that is needed to iterate from an initial state towards the solution for the first frame. The iterations for subsequent frames are based on the previous results. Here, presuming a properly converged predecessor, the convergence rate is only affected by the algorithmic efficiency, the choice of parameters and the dynamics of the scene content.

By comparing the estimation results in the top row of FIG. 6 for frame 1 at iteration 10 with the curves' progressions it can be seen that the results can be considered as converged as soon as the curve of the fraction of hypotheses updates 102 and the curve of the mean propagation path length 104 almost reach their lower and upper bound respectively. This observation can be supported from a theoretical perspective as well. As soon as almost all hypotheses updates are rejected, the existing hypotheses are considered as best choice. The saturation of the average propagation path length can be interpreted analogously. If the mean propagation path does not further expand, the existing hypotheses are superior to any competitor from a propagation attempt. Here an additional requirement for a fast convergence can be identified. Not only a small propagation path length is desirable, but also a steep ascent of the path length for each iteration until the upper bound is reached. Finally, the cumulated seed value fraction 100 plot can be interpreted as the empirically determined amount of seed values that may have been used to reach a converged state. According to FIG. 9, this value fluctuates approximately between 0.05 (i.e. 5%) for the first frame and 0.14 (i.e. 14%) for consecutive frames. Regarding a convergence criterion, the empirically determined upper bound of the propagation path length can be considered as a robust cue for the achievement of convergence. The iteration is terminated if a maximal mean propagation path threshold $T_{pp}$ is reached or a maximal iteration count is exceeded. The propagation path threshold is chosen relatively to the determined upper bound.

Figure 10:
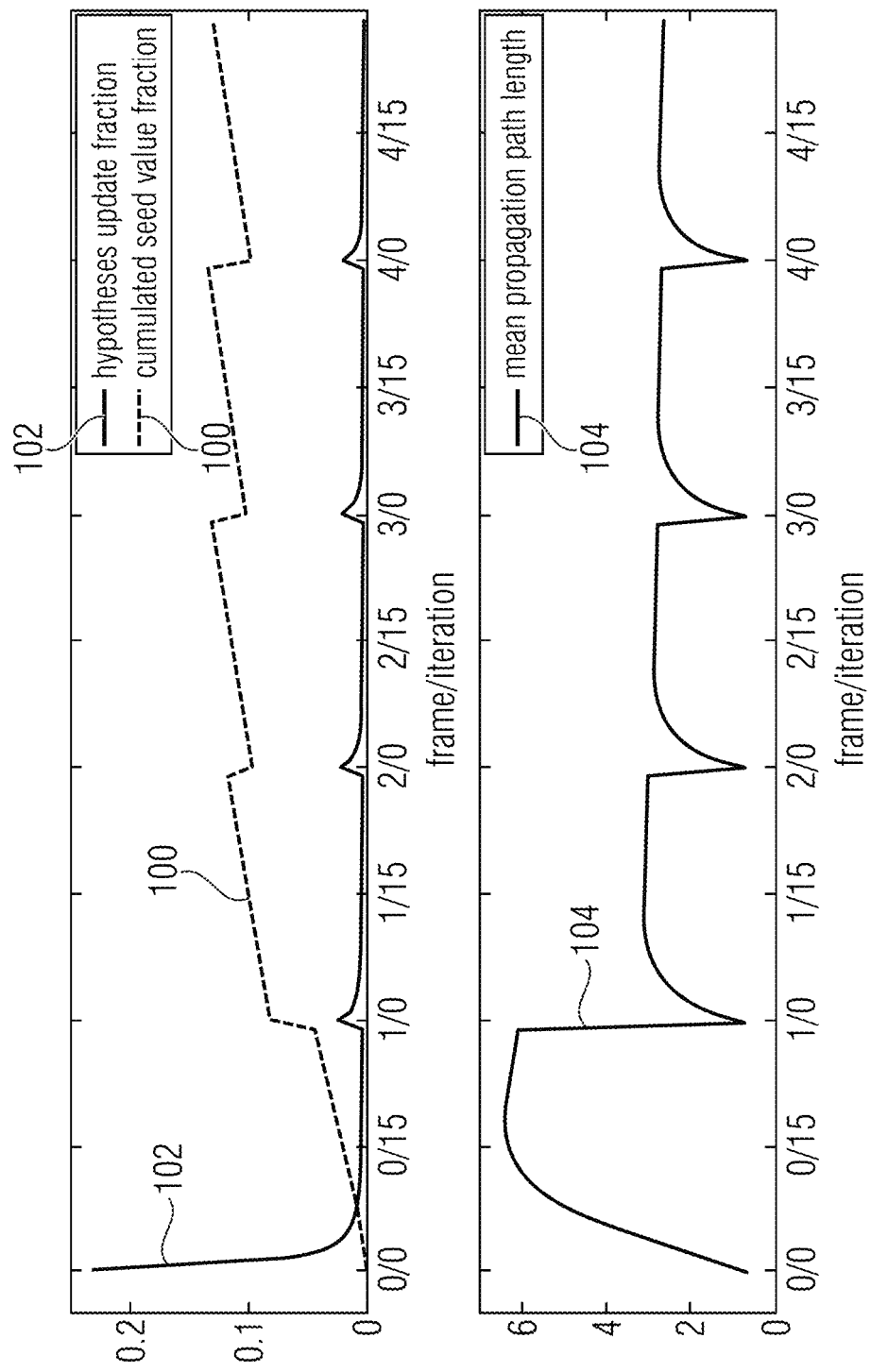
FIG. 10 shows a schematic line chart indicating statistics for the Oliver1 dataset regarding hypotheses update acceptance and seed generation at the top of FIG. 10 and a propagation path length at the bottom of FIG. 10, wherein the processing was conducted with a deterministic 4 neighborhood.

Finally, a comparison of the convergence properties between a deterministic 4-neighborhood and a randomized neighborhood $\mathcal{N}_R^4$ 106, 110 with four random samples is conducted and the impact of multi-scale processing is investigated. FIG. 10 illustrates a close-up of the first two frames of FIG. 9 for four different algorithmic configurations. In contrast to the analysis in FIG. 9 only 12 iterations have been carried out in order to better expose the slopes of the curves. Regarding the hypotheses update fraction, there is no significant difference between the randomized and the deterministic neighborhood.

Figure 11:
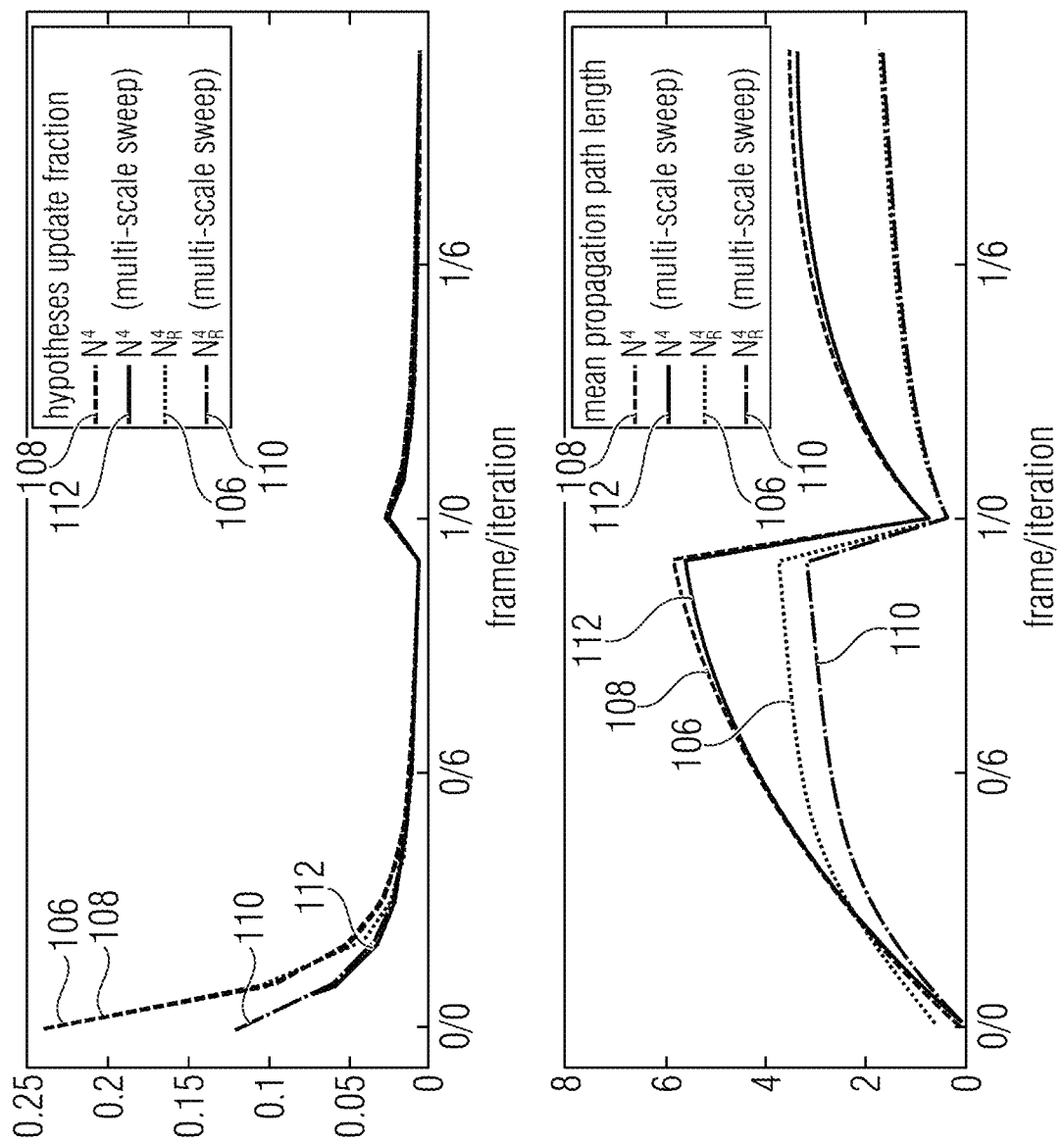
FIG. 11 shows a schematic line chart indicating a comparison of convergence properties for four different algorithmic configurations.

Due to the hypotheses updates from other sweep levels the update fraction is much lower for the first few iteration of the multi-scale sweep. In contrast a significant difference between the randomized and the deterministic neighborhood can be observed for the mean propagation path length. In case of $\mathcal{N}^4$ 108, 112, the average path length is almost twice as large as with the randomized neighborhood. Additionally, the path length reduction for the multi-scale sweep is considerably greater for $\mathcal{N}_R^4$ 106, 110. A qualitative comparison of the rate of convergence is provided in FIG. 11. The results on the top of this figure have been computed without multi-scale iterations. The intermediate results on the bottom have been computed with multi-scale sweep. For the latter, a significant improvement of the rate of convergence can be observed. The left row of images in FIG. 11 shows the propagation of results that has been computed via a deterministic 4-neighborhood. The right row of images shows results, where a randomized neighborhood was applied. A qualitative comparison reveals two major benefits of the randomized propagation approach. First, especially in case of multi-scale sweep, the rate of convergence is significantly greater than for the deterministic neighborhood. Second, the results on the right exhibit much less specular noise as the randomized structure of the neighborhood mitigates the local accumulation of mismatches.

Figure 12:
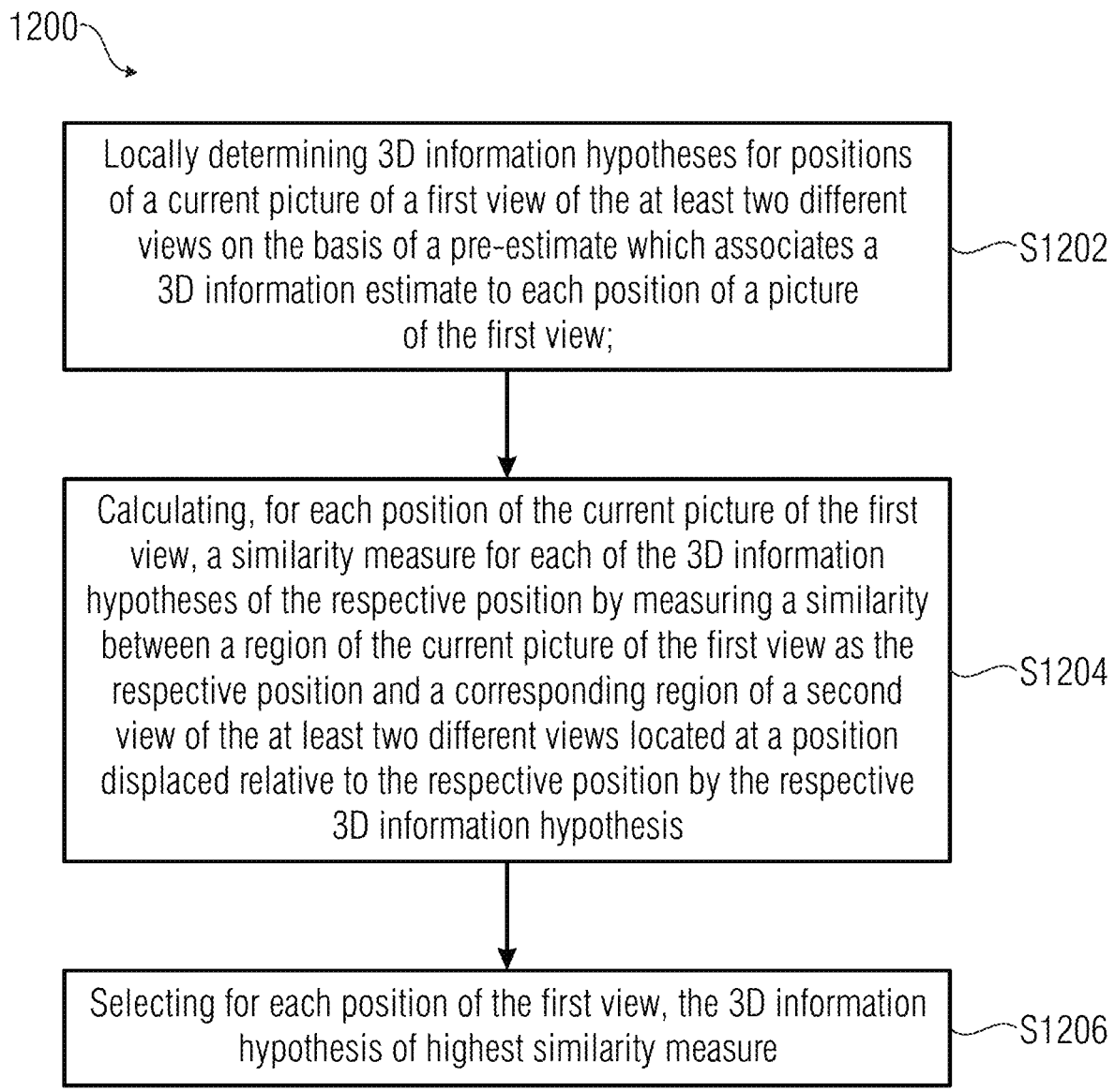
FIG. 12 shows a schematic flowchart of a method for performing 3D estimation on the basis of pictures of at least two different fields.

FIG. 12 shows a schematic block diagram of a method 1200 for performing 3D estimation on the basis of pictures of at least two different views. The method 1200 comprises a step S1202 of locally determining 3D information hypotheses for positions of a current picture of a first view of the at least two different views on the basis of a pre-estimate which associates a 3D information estimate to each position of the current picture of the first view, a step S1204 of calculating, for each position of the current picture of the first view, a similarity measure for each of the 3D information hypothesis of the respective position by measuring a similarity between a region of the current picture of the first view at the respective position and a corresponding region of a second view of the at least two different views located at a position displaced relative to the respective position by a respective 3D information hypothesis, and a step S1206 of selecting for each position of the first view, the 3D information hypothesis of highest similarity measure.

According to embodiments, a correspondence analysis algorithm for depth/disparity/3D reconstruction that processes each pixel individually and propagates information by iteration and candidate selection by local statistics is shown. The correspondence analysis is a pixel based processing and performed locally independent from its neighborhood in the current iteration. Therefore it is optimally suited for parallel processing e.g. on GPU. The correspondence analysis is based on few candidates, the so-called hypotheses, from the previous processing, which can be an analysis result from the previous frame or from a previous iteration of the same image in the static case. The information propagation e.g. 3D information from neighboring pixels to a current pixel may be achieved by iterating the correspondence analysis one or several times.

The hypotheses from neighboring positions may be selected based on local statistics e.g by a probability density function (PDF). The PDF may be calculated for each pixel separately and can be parametrized in various ways e.g.:
- due to general models (e.g. just variance based adjustment or other)
- based on a dedicated training phase which reflects the statistical properties of the image in the optimal way (e.g. complex scene based statistical evaluation of distribution type and distribution parameters of the PDF)

Using the approach of the dedicated training phase, structures of the current picture may be analyzed thus leading to an improved information propagation. The information propagation is improved since the 3D information of those neighbors reflecting the same structural element (and therefore most likely have a similar 3D information) may be advantageous and thus propagated with a higher statistical probability to the current position than 3D information from neighboring positions having a different structure.

Further embodiments show the IPS algorithm wherein the spatial planes that are evaluated during the sweeping procedure represent the potential object orientation. However, in contrast to plane sweeping, the proposed hypotheses representation has individual patches for each pixel, for each plane the object orientation is constant across the whole image. Second, the sweep procedure consists of the evaluation of a list of spatial planes, while IPS proposes the evaluation of dynamically generated lists of patches for each individual pixel.

It has to be noted that SGM is conceptually not related to the IPS algorithm. Furthermore IPS provides a statistic guidance for the hypotheses updates based on the evaluation of the potential variable updates from numerical optimization. Moreover, IPS uses a statistically guided approach that is based on the evaluation of the potential variable updates from numerical optimization. IPS does not use a fixed randomization for plane refinement nor a constant reduction rule for the refinement range of the variables.

According to an example, the hypotheses provider is configured to determine at most 50, at most 20, at most 10, or lest or equal than 6 different 3D information hypotheses in one iteration.

According to a further example, a position of the current picture is a pixel of the current picture.

According to a further example, the hypotheses provider 4 configured for locally determining third 3D information hypotheses 10, 10' for positions 24 of the current picture 26 of a third view 12 of the at least two different views 12, 12' on the basis of a third pre-estimate 28, 28' which associates the third 3D information estimate 14, 14' to each position 24 of a picture 26 of the first view 12; the similarity measure calculator 6 for calculating, for each position 24 of the current picture 26 of the third view 12, a similarity measure 18, 18' for each of the third 3D information hypotheses 10, 10' of the respective position by measuring a similarity between a region 36, 36' of the current picture of the third view 12 at the respective position and a corresponding region 24' of the second view 12' of the at least two different views located at a position 24' displaced relative to the respective position by the respective 3D information hypotheses; and the 3D information determiner 8 configured to select, for each position of the third view 12, the 3D information hypothesis 18 of the third 3D information hypotheses of highest similarity measure.

It is to be understood that in this specification, the signals on lines are sometimes named by the reference numerals for the lines or are sometimes indicated by the reference numerals themselves, which have been attributed to the lines. Therefore, the notation is such that a line having a certain signal is indicating the signal itself. A line can be a physical line in a hardwired implementation. In a computerized implementation, however, a physical line does not exist, but the signal represented by the line is transmitted from one calculation module to the other calculation module.

Although the present invention has been described in the context of block diagrams where the blocks represent actual or logical hardware components, the present invention can also be implemented by a computer-implemented method. In the latter case, the blocks represent corresponding method steps where these steps stand for the functionalities performed by corresponding logical or physical hardware blocks.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

The inventive transmitted or encoded signal can be stored on a digital storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive method is, therefore, a data carrier (or a non-transitory storage medium such as a digital storage medium, or a computer-readable medium) comprising, recorded thereon, the computer program for performing one of the methods described herein. The data carrier, the digital storage medium or the recorded medium are typically tangible and/or non-transitory.

A further embodiment of the invention method is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Inter alia, the following embodiments have been described:

1. Apparatus for performing 3D estimation on the basis of pictures of at least two different views, the apparatus comprising:
   a hypotheses provider configured for locally determining 3D information hypotheses for positions of a current picture of a first view of the at least two different views on the basis of a pre-estimate which associates a 3D information estimate to each position of a picture of the first view;
   a similarity measure calculator for calculating, for each position of the current picture of the first view, a similarity measure for each of the 3D information hypotheses of the respective position by measuring a similarity between a region of the current picture of the first view at the respective position and a corresponding region of a second view of the at least two different views located at a position displaced relative to the respective position by the respective 3D information hypotheses; and
   a 3D information determiner configured to select, for each position of the first view, the 3D information hypothesis of highest similarity measure.

2. Apparatus according to embodiment 1, wherein the hypotheses provider is configured for determining at least one 3D information hypothesis of the 3D information hypotheses for a current position of the current picture of the first view using updating the 3D information estimate of the current position of the picture of the first view of the pre-estimate by a random update value, wherein the hypotheses provider is configured to determine the random update value based on a statistical distribution of update values.

3. Apparatus according to embodiment 2, wherein the hypotheses provider is configured to determine the statistical distribution of update values based on previously determined update values related to the positions.

4. Apparatus according to any of the preceding embodiments, wherein the hypotheses provider is configured for determining at least one 3D information hypothesis of the 3D information hypotheses for a current position of the current picture of the first view using one or more neighboring positions of the current position of the pre-estimate.

5. Apparatus according to any of the preceding embodiments, wherein the apparatus is configured to perform a further iteration for performing 3D estimation on the basis of the current picture, wherein the 3D information estimate of each position of the current picture of the first view of the further iteration is the selected 3D information hypothesis for the respective positions of the current picture of the first view of a preceding iteration.

6. Apparatus according to any of the preceding embodiments, wherein the hypotheses provider is configured for determining the 3D information hypotheses for a current position of the current picture for a further iteration using:
   selecting the 3D information estimate of the current position of the current picture from an iteration preceding the further iteration;
   randomly selecting one or more 3D information estimates of one or more positions neighboring the current position of the current picture from an iteration preceding the further iteration; and
   updating the selected 3D information estimate of the current position of the current picture from an iteration preceding the further iteration using a random update value with respect to a suitable statistic.

7. Apparatus according to any of the preceding embodiments, wherein the hypotheses provider is configured for randomly selecting 3D information hypotheses for a current position of the positions of the current picture of the first view using a statistical measure and for determining the 3D information hypotheses for a further position of the positions of the current picture of the first view different from the current position using a further statistical measure different from the statistical measure.

8. Apparatus according to embodiment 7, wherein the hypotheses provider is configured for randomly selecting at least one 3D information hypothesis of the 3D information hypotheses using a randomized spatial neighborhood as a statistical measure or a further statistical measure.

9. Apparatus according to any of embodiments 5 to 8, wherein the apparatus is configured to perform an iteration of the 3D estimation on a representation of the picture of the first view downscaled with a first scaling factor and to perform the further iteration on a representation of the picture of the first view scaled with a second scaling factor, wherein the first scaling factor is greater than the second scaling factor.

10. Apparatus according to any of the preceding embodiments,
    wherein the hypotheses provider is further configured for locally determining further 3D information hypotheses for positions of the current picture of a second view of the at least two different views on the basis of the pre-estimate or a further pre-estimate, which associates the 3D information estimate or a further 3D information estimate to each position of a picture of the second view;
    wherein the similarity measure calculator is further configured for calculating, for each position of the current picture of the second view, a similarity measure for each of the further 3D information hypotheses of the respective position by measuring a similarity between a region of the current picture of the second view at the respective position and a corresponding region of the first view of the at least two different views located at a position displaced relative to the respective position by the respective further 3D information hypotheses;
    wherein the 3D information determiner is further configured to select, for each position of the second view, the further 3D information hypothesis of highest similarity measure; and
    wherein a consistency tester is configured to mutually test with a mutual test whether the selected 3D information hypothesis of the picture of the first view and the selected further 3D information hypothesis of the picture of the second view fulfill a consistency criterion, thus indicating a positive test result.

11. Apparatus according to embodiment 10,
    wherein the consistency tester is configured to perform the mutual test:
    for an orientation of respective regions of the picture of the first view having, for each position, the selected 3D information hypothesis and the picture of the second view having, for each position, the selected further 3D information hypothesis and/or
    for center positions of respective regions of the picture of the first view having, for each position, the selected 3D information hypothesis and the picture of the second view having, for each position, the selected further 3D information hypothesis and wherein the consistency tester is configured to obtain a consistency mask comprising a consistency measure for each position of the picture, wherein a high consistency measure indicates a deviation from selected 3D information hypothesis of the picture of the first view from the selected 3D information hypothesis of the picture of the second view at the respective positions of the picture of the first view and the picture of the second view as below a predefined threshold value and wherein a low consistency measure indicates the deviation as equal to or above a predefined threshold value.

12. Apparatus according to embodiment 11, wherein the hypotheses provider is configured to determine:

the 3D information hypotheses of the picture of the first view based on the consistency mask calculated for the pre-estimate, wherein the hypotheses provider selects at least one 3D hypothesis of the 3D information hypotheses determined using the 3D information estimates of the picture of the first view at positions neighboring the current position in the pre-estimate having a high consistency measure and wherein the hypotheses provider discards a 3D information estimate of the picture of the first view determined using the 3D information estimates of the picture of the first view at positions neighboring the current position having a low consistency measure; or the further 3D information hypotheses of the picture of the second view based on the consistency mask calculated for the further pre-estimate, wherein the hypotheses provider selects at least one 3D hypothesis of the further 3D information hypotheses determined using the 3D information estimates of the picture of the second view at positions neighboring the current position in the further pre-estimate having a high consistency measure and wherein the hypotheses provider discards a 3D information estimate of the picture of the second view determined using the 3D information estimates of the picture of the second view at positions neighboring the current position having a low consistency measure;

wherein the 3D similarity measure calculator is configured to perform the similarity measure on the at least one selected 3D hypothesis of the 3D hypothesis or on the at least one selected 3D hypothesis of the further 3D hypothesis.

13. Apparatus according to any of the preceding embodiments, wherein the pre-estimate is a representation of the current picture of the first view from a preceding iteration having 3D information estimates for each position of the current picture determined based on the selected 3D information hypothesis for each position of the picture of the first view from a preceding iteration of the current picture of the first view; or wherein the pre-estimate is a preceding picture in a sequence of pictures having 3D information estimates of the preceding picture of the first view or having 3D information estimates of the preceding picture of the second view.

14. Method for performing 3D estimation on the basis of pictures of at least two different views, the method comprising:

locally determining 3D information hypotheses for positions of a current picture of a first view of the at least two different views on the basis of a pre-estimate which associates a 3D information estimate to each position of a picture of the first view;

calculating, for each position of the current picture of the first view, a similarity measure for each of the 3D information hypotheses of the respective position by measuring a similarity between a region of the current picture of the first view as the respective position and a corresponding region of a second view of the at least two different views located at a position displaced relative to the respective position by the respective 3D information hypothesis; and selecting for each position of the first view, the 3D information hypothesis of highest similarity measure.

15. Computer program having a program code for performing the method according to embodiment 14 when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

REFERENCES

[1] S. T. Barnard and M. A. Fischler, "Computational Stereo", ACM Comput. Surv., vol. 14, no. 4, pp. 553-572, December 1982.

[2] R. T. Collins, "A Space-Sweep Approach to True Multi-Image Matching", in Computer Vision and Pattern Recognition, IEEE Computer Society Conference on, Los Alamitos, Calif., USA, 1996, Vol. 0, p. 358, IEEE Computer Society.

[3] M. Dumont, S. Rogmans, G. Lafruit, and P. Bekaert, "Immersive Teleconferencing with Natural 3d Stereoscopic Eye Contact Using GPU Computing", in Proceedings of 3D Stereo Media, Liege, Belgium, 2010.

[4] M. Dumont, S. Rogmans, S. Maesen, and P. Bekaert, "Optimized Two-Party Video Chat with Restored Eye Contact Using Graphics Hardware", in e-Business and Telecommunications, J. Filipe and M. S. Obaidat, Eds., Vol. 48, pp. 358-372. Springer Berlin Heidelberg, Berlin, Heidelberg, 2009.

[5] M. Dumont, S. Maesen, S. Rogmans, and P. Bekaert, "A Prototype for Practical Eye-Gaze Corrected Video Chat on Graphics Hardware", in SIGMAP, 2008, pp. 236-243.

[6] S. Rogmans, J. Lu, P. Bekaert, and G. Lafruit, "Real-time stereo-based view synthesis algorithms: A unified framework and evaluation on commodity GPUs", Image Commun., Vol. 24, no. 1-2, pp. 49-64, January 2009.

[7] S. Rogmans, M. Dumont, T. Cuypers, G. Lafruit, and P. Bekaert, "Complexity Reduction of Real-time Depth Scanning on Graphics Hardware", in VISAPP (1), 2009, pp. 547-550.

[8] R. Yang, M. Pollefeys, H. Yang, and G. Welch, "A unified approach to real-time, multiresolution, multi-baseline 2d view synthesis and 3d depth estimation using commodity graphics hardware", International Journal of Image and Graphics, Vol. 04, no. 04, pp. 627-651, October 2004.

[9] G. Welch, H. Fuchs, B. Cairns, K. Mayer-Patel, D. H. Sonnenwald, R. Yang, A. State, H. Towles, A. Ilie, M.

Noland, V. Noel, and H. Yang, "Improving, Expanding and Extending 3d Telepresence", in Proceedings of the 2005 International Workshop on Advanced Information Processing for Ubiquitous Networks, 15th International Conference on Artifical Reality and Telexistence (ICAT2005), Canterbury, Christchurch, New Zealand, 2005.

[10] A. Criminisi, J. Shotton, A. Blake, and P. Torr, "Gaze Manipulation for One-to-one Teleconferencing", in International Conference on Computer Vision, Los Alamitos, Calif., USA, 2003, Vol. 1, p. 191, IEEE Computer Society.

[11] J. Liu, I. P. Beldie, and M. Wöpking, "A Computational Approach To Establish Eye-Contact In Videocommunication", in Proceedings of International Workshop on Stereoscopic and Three Dimensional Imaging, (IWS3DI), Greece, 1995, pp. 229-234.

[12] M. Ott, J. P. Lewis, and 1. Cox, "Teleconferencing eye contact using a virtual camera", in INTERACT '93 and CHI '93 conference companion on Human factors in computing systems—CHI '93, Amsterdam, The Netherlands, 1993, pp. 109-110.

[13] J. Cox, S. Hingorani, B. M. Maggs, and S. B. Rao, "Stereo Without Disparity Gradient Smoothing: a Bayesian Sensor Fusion Solution", in BMVC'92, D. H. B. DPhil, MSc and R. B. BA, Eds., pp. 337-346. Springer London, 1992, DOI: 10.1007/978-1-4471-3201-1 35.

[14] J.-R. Ohm, K. Grüuneberg, E. Hendriks, M. Ebroul Izquierdo, D. Kaliva, M. Karl, D. Papadimatos, and A. Redert, "A realtime hardware system for stereoscopic videoconferencing with viewpoint adaptation", Signal Processing: Image Communication, Vol. 14, no. 1-2, pp. 147-171, November 1998.

[15] Y.-P. Tsai, C.-C. Kao, Y.-P. Hung, and Z.-C. Shih, "Real-Time Software Method for Preserving Eye Contact in Video Conferencing", J. Inf. Sci. Eng., Vol. 20, no. 5, pp. 1001-1017, 2004.

[16] O. Divorra Escoda, J. Civit, F. Zuo, H. Belt, I. Feldmann, O. Schreer, E. Yellin, W. Ijsselsteijn, R. van Eijk, D. Espinola, P. Hagendorf, W. Waizenegger, and R. Braspenning, "Towards 3d-Aware Telepresence: Working on Technologies Behind the Scene", in Proc. of ACM Conference on Computer Supported Cooperative Work (CSCW), New Frontiers in Telepresence, Savannah, Ga., USA, February 2010.

[17] P. Kauff and O. Schreer, "An Immersive 3d Videoconferencing System Using Shared Virtual Team User Environments", in Proceedings of the 4th International Conference on Collaborative Virtual Environments, New York, N.Y., USA, 2002, CVE '02, pp. 105-112, ACM.

[18] B. J. Lei and E. A. Hendriks, "Real-time multi-step view reconstruction for a virtual teleconference system", EURASIP J. Appl. Signal Process., Vol. 2002, no. 1, pp. 1067-1087, January 2002.

[19] Feldmann, W. Waizenegger, N. Atzpadin, and O. Schreer, "Real-time depth estimation for immersive 3d videoconferencing", in 3DTV-Conference: The True Vision—Capture, Transmission and Display of 3D Video (3DTV-CON), 2010, June 2010, pp. 1-4.

[20] Feldmann, N. Atzpadin, O. Schreer, J.-C. Pujol-Acolado, J. Landabaso, and O. Escoda, "Multi-view depth estimation based on visual-hull enhanced Hybrid Recursive Matching for 3d video conference systems", in 2009 16th IEEE International Conference on Image Processing (ICIP), November 2009, pp. 745-748.

[21] P. Kauff, O. Schreer, and J.-R. Ohm, "An universal algorithm for real-time estimation of dense displacement vector fields", in Proc. of Int. Conf. on Media Futures, Florence, Italy, 2001.

[22] C. Riechert, F. Zilly, and P. Kauff, "Real time depth estimation using line recursive matching", in European Conference on Visual Media Production (CVMP), 2011.

[23] C. Riechert, F. Zilly, M. Mueller, and P. Kauff, "Real-Time Disparity Estimation Using Line-Wise Hybrid Recursive Matching and Cross-Bilateral Median Up-Sampling", in 21st International Conference on Pattern Recognition (ICPR). 2012, pp. 3168-3171, IEEE.

[24] C. Riechert, F. Zilly, P. Kauff, J. Güther, and R. Schäfer, "Fully Automatic Stereo-to-Multiview Conversion in Autostereoscopic Displays", The Best of IET and IBC, Vol. 4, pp. 8-14, 2012.

[25] H. Hirschmuller, "Accurate and efficient stereo processing by semi-global matching and mutual information", in IEEE Computer Society Conference on Computer Vision and Pattern Recognition, 2005. CVPR 2005, 2005, Vol. 2, pp. 807-814.

[26] H. Hirschmueller, "Stereo Processing by Semiglobal Matching and Mutual Information", IEEE Transactions on Pattern Analysis and Machine Intelligence, Vol. 30, no. 2, pp. 328-341, February 2008.

[27] H. Hirschmueller, "Stereo Vision in Structured Environments by Consistent Semi-Global Matching", in Proceedings of the 2006 IEEE Computer Society Conference on Computer Vision and Pattern Recognition—Volume 2, 2006, pp. 2386-2393, IEEE Computer Society.

[28] S. Hermann and R. Klette, "Iterative Semi-Global Matching for Robust Driver Assistance Systems", in Computer Vision—ACCV 2012, K. M. Lee, Y. Matsushita, J. M. Rehg, and Z. Hu, Eds., number 7726 in Lecture Notes in Computer Science, pp. 465-478. Springer Berlin Heidelberg, November 2012, DOI: 10.1007/978-3-642-37431-9 36.

[29] Ernst and H. Hirschmueller, "Mutual Information Based Semi-Global Stereo Matching on the GPU", in Advances in Visual Computing, G. Bebis, R. Boyle, B. Parvin, D. Koracin, P. Remagnino, F. Porikli, J. Peters, J. Klosowski, L. Arns, Y. K. Chun, T.-M. Rhyne, and L. Monroe, Eds., number 5358 in Lecture Notes in Computer Science, pp. 228-239. Springer Berlin Heidelberg, December 2008, DOI: 10.1007/978-3-540-89639-5 22.

[30] M. Michael, J. Salmen, J. Stallkamp, and M. Schlipsing, "Real-time stereo vision: Optimizing Semi-Global Matching", in 2013 IEEE Intelligent Vehicles Symposium (IV), June 2013, pp. 1197-1202.

[31] H. Hirschmueller, M. Buder, and I. Ernst, Memory efficient semi-global matching" ISPRS Annals of the Photogrammetry, Remote Sensing and Spatial Information Sciences, Vol. 3, pp. 371-376, 2012.

[32] D. Honegger, H. Oleynikova, and M. Pollefeys, "Real-time and low latency embedded computer vision hardware based on a combination of FPGA and mobile CPU", in 2014 IEEE/RSJ International Conference on Intelligent Robots and Systems (IROS 2014), September 2014, pp. 4930-4935.

[33] M. Buder, "Dense real-time stereo matching using memory efficient semi-global-matching variant based on FPGAs", in SPIE Photonics Europe. 2012, pp. 843709-843709, International Society for Optics and Photonics.

[34] C. Banz, S. Hesselbarth, H. Flatt, H. Blume, and P. Pirsch, "Real-time stereo vision system using semi-global matching disparity estimation: Architecture and

[35] M. Bleyer, C. Rhemann, and C. Rother, "PatchMatch Stereo-Stereo Matching with Slanted Support Windows", in BMVC, 2011, Vol. 11, pp. 1-11.

[36] C. Barnes, E. Shechtman, A. Finkelstein, and D. Goldman, "PatchMatch: A randomized correspondence algorithm for structural image editing", ACM Transactions on Graphics-TOG, Vol. 28, no. 3, pp. 24, 2009.

[37] P. Heise, S. Klose, B. Jensen, and A. Knoll, "PM-Huber: PatchMatch with Huber Regularization for Stereo Matching", in 2013 IEEE International Conference on Computer Vision (ICCV), December 2013, pp. 2360-2367.

[38] Lu, H. Yang, D. Min, and M. Do, "Patch Match Filter: Efficient Edge-Aware Filtering Meets Randomized Search for Fast Correspondence Field Estimation", in 2013 IEEE Conference on Computer Vision and Pattern Recognition (CVPR), June 2013, pp. 1854-1861.

[39] F. Besse, C. Rother, A. Fitzgibbon, and J. Kautz, "PMBP: Patchmatch belief propagation for correspondence field estimation", International Journal of Computer Vision, Vol. 110, no. 1, pp. 2-13, 2014.

[40] S. Xu, F. Zhang, X. He, X. Shen, and X. Zhang, "PM-PM: PatchMatch With Potts Model for Object Segmentation and Stereo Matching", IEEE Transactions on Image Processing, Vol. 24, no. 7, pp. 2182-2196, July 2015.

[41] D. Scharstein and R. Szeliski, "A Taxonomy and Evaluation of Dense Two-Frame Stereo Correspondence Algorithms", International Journal of Computer Vision, Vol. 47, no. 1, pp. 7-42, April 2002.

[42] N. Einecke and J. Eggert, "Stereo image warping for improved depth estimation of road surfaces", in 2013 IEEE Intelligent Vehicles Symposium (IV), June 2013, pp. 189-194.

[43] S. Gehrig, N. Schneider, and U. Franke, "Exploiting Traffic Scene Disparity Statistics for Stereo Vision", in 2014 IEEE Conference on Computer Vision and Pattern Recognition Workshops (CVPRW), June 2014, pp. 688-695.

[44] W. Waizenegger, N. Atzpadin, O. Schreer, and I. Feldmann, "Patch-Sweeping with robust prior for high precision depth estimation in real-time systems", in Proc. International Conference on Image Processing (ICIP), Brussels, Belgium, 2011.

[45] R. Hartley and A. Zisserman, Multiple View Geometry in Computer Vision, Cambridge University Press, 2 edition, March 2004.

[46] "cuRAND", September 2014. 10

The invention claimed is:

1. An apparatus for performing 3D estimation on the basis of pictures of at least two different views of the same scenery taken at different perspectives, the apparatus comprising:
a hypotheses provider configured for determining, for each position of positions of a current picture of a first view, 3D information hypotheses on the basis of a pre-estimated depth/disparity map of the current picture of the first view, wherein the 3D information hypotheses are potential 3D estimates, the positions being one of pixels of the current picture or groups of pixels of the current picture;
a similarity measure calculator for calculating, for each position of the current picture of the first view, a similarity, for each of the 3D information hypotheses of the respective position, between a region of the current picture of the first view at the respective position and a corresponding region of a second view of the at least two different views located at a position displaced relative to the respective position by the respective 3D information hypothesis; and
a 3D information determiner configured to select, for each position of the first view, the 3D information hypothesis of highest similarity in order to acquire an updated depth/disparity map,
wherein the hypotheses provider is configured to perform the determination of the 3D information hypotheses for each position of the positions of the current picture of the first view on the basis of the pre-estimated depth/disparity map and independent from the 3D information hypothesis of highest similarity selected for any surrounding position of the positions of the current picture of the first view,
wherein the pre-estimated depth/disparity map is obtained at a preceding iteration or at a preceding frame.

2. The apparatus according to claim 1, wherein the hypotheses provider is configured for determining at least one 3D information hypothesis of the 3D information hypotheses for a current position of the current picture of the first view using updating the 3D information estimate of the current position of the picture of the first view of the pre-estimated depth/disparity map by a random update value, wherein the hypotheses provider is configured to determine the random update value based on a statistical distribution of update values.

3. The apparatus according to claim 2, wherein the hypotheses provider is configured to determine the statistical distribution of update values based on previously determined update values related to the positions.

4. The apparatus according to claim 1, wherein the hypotheses provider is configured for determining at least one 3D information hypothesis of the 3D information hypotheses for a current position of the current picture of the first view using one or more neighboring positions of the current position of the pre-estimated depth/disparity map.

5. The apparatus according to claim 1, wherein the apparatus is configured to perform a further iteration for performing 3D estimation on the basis of the current picture, wherein the pre-estimated depth/disparity map of the further iteration is the updated depth/disparity map.

6. The apparatus according to claim 1, wherein the hypotheses provider is configured for determining the 3D information hypotheses for a current position of the current picture for a further iteration using:
selecting a value of the updated depth/disparity map at the current position from an iteration preceding the further iteration;
randomly selecting one or more values of the updated depth/disparity map at one or more positions neighboring the current position of the current picture from an iteration preceding the further iteration; and
updating the value of the updated depth/disparity map at the current position of the current picture from an iteration preceding the further iteration or the one or more values of the updated depth/disparity map at one or more positons neighboring the current position of the current picture from an iteration preceding the further iteration using a random update value with respect to a suitable statistic.

7. The apparatus according to claim 1, wherein the hypotheses provider is configured for randomly selecting 3D information hypotheses for a current position of the positions of the current picture of the first view using a statistical measure and for determining the 3D information hypotheses for a further position of the positions of the current picture of the first view different from the current positions using a further statistical measure different from the statistical measure.

8. The apparatus according to claim 7, wherein the hypotheses provider is configured for randomly selecting at least one 3D information hypothesis of the 3D information hypotheses using a randomized spatial neighborhood as a statistical measure or a further statistical measure.

9. The apparatus according to claim 5, wherein the apparatus is configured to perform an iteration of the 3D estimation on a representation of the picture of the first view downscaled with a first scaling factor and to perform the further iteration on a representation of the picture of the first view scaled with a second scaling factor, wherein the first scaling factor is greater than the second scaling factor.

10. The apparatus according to claim 1,
wherein the hypotheses provider is further configured for determining further 3D information hypotheses for positions of the current picture of a second view of the at least two different views on the basis of the pre-estimated depth/disparity map or a pre-estimated further depth/disparity map, which associates the 3D information estimate or a further 3D information estimate to each position of a picture of the second view;
wherein the similarity measure calculator is further configured for calculating, for each position of the current picture of the second view, a similarity for each of the further 3D information hypotheses of the respective position between a region of the current picture of the second view at the respective position and a corresponding region of the first view of the at least two different views located at a position displaced relative to the respective position by the respective further 3D information hypothesis;
wherein the 3D information determiner is further configured to select, for each position of the second view, the further 3D information hypothesis of highest similarity in order to acquire an updated further depth/disparity map; and
wherein a consistency tester is configured to mutually test with a mutual test whether the selected 3D information hypothesis of the picture of the first view and the selected further 3D information hypothesis of the picture of the second view fulfill a consistency criterion, thus indicating a positive test result.

11. The apparatus according to claim 10,
wherein the consistency tester is configured to perform the mutual test:
for an orientation of respective regions of the picture of the first view comprising, for each position, the selected 3D information hypothesis and the picture of the second view comprising, for each position, the selected further 3D information hypothesis and/or
for center positions of respective regions of the picture of the first view comprising, for each position, the selected 3D information hypothesis and the picture of the second view comprising, for each position, the selected further 3D information hypothesis and
wherein the consistency tester is configured to acquire a consistency mask comprising a consistency measure for each position of the picture, wherein a high consistency measure indicates a deviation from selected 3D information hypothesis of the picture of the first view from the selected 3D information hypothesis of the picture of the second view at the respective positions of the picture of the first view and the picture of the second view as below a predefined threshold value and wherein a low consistency measure indicates the deviation as equal to or above a predefined threshold value.

12. The apparatus according to claim 11,
wherein the hypotheses provider is configured to determine:
the 3D information hypotheses of the picture of the first view based on the consistency mask calculated for the pre-estimated depth/disparity map, wherein the hypotheses provider selects at least one 3D hypothesis of the 3D information hypotheses determined using the pre-estimated depth/disparity map of the picture of the first view at positions neighboring the current position in the pre-estimated depth/disparity map comprising a high consistency measure and wherein the hypotheses provider discards a value of the pre-estimated depth/disparity map of the picture of the first view determined using the 3D information estimates of the picture of the first view at positions neighboring the current position comprising a low consistency measure; or
the further 3D information hypotheses of the picture of the second view based on the consistency mask calculated for the pre-estimated further depth/disparity map, wherein the hypotheses provider selects at least one 3D hypothesis of the further 3D information hypotheses determined using the pre-estimated further depth/disparity map of the picture of the second view at positions neighboring the current position in the pre-estimated further depth/disparity map comprising a high consistency measure and wherein the hypotheses provider discards a value of the pre-estimated further depth/disparity map of the picture of the second view determined using the 3D information estimates of the picture of the second view at positions neighboring the current position comprising a low consistency measure;
wherein the 3D similarity measure calculator is configured to calculate the similarity for the at least one selected 3D hypothesis of the 3D hypothesis or for the at least one selected 3D hypothesis of the further 3D hypothesis.

13. The apparatus according to claim 1, wherein the pre-estimated depth/disparity map is an updated depth/disparity map from a preceding iteration; or
wherein the pre-estimated depth/disparity map is a finally updated depth/disparity map for a preceding picture in a sequence of pictures which precedes the current picture.

14. The apparatus according to claim 1, wherein the hypotheses provider is configured for determining the 3D information hypotheses for each position of the positions of the current picture of the first view so as to comprise
a 3D information pre-estimate indicated by the depth/disparity map for the respective position of the current picture;
one or more 3D information pre-estimates indicated by the depth/disparity map for one or more positions neighboring the respective position of the current picture; and
an updated 3D information hypothesis acquired by randomizing a 3D information pre-estimate indicated by the depth/disparity map for the respective position of the current picture or a position neighboring the respective position of the current picture.

15. The apparatus according to claim 14, wherein the hypotheses provider is configured for randomly selecting the one or more positions neighboring the current position of the current picture for each position of the positions of the current picture of the first view.

16. The apparatus according to claim 1, wherein apparatus is configured to perform the 3D estimation iteratively with the pre-estimated depth/disparity map being an updated depth/disparity map of a previous iteration, or the pre-estimated depth/disparity map is a depth/disparity map of a previous frame of a sequence of pictures of the first view.

17. A method for performing 3D estimation on the basis of pictures of at least two different views of the same scenery taken at different perspectives, the method comprising:
   determining 3D information hypotheses for each position of positions of a current picture of a first view on the basis of a pre-estimated depth/disparity map of the current picture of the first view, wherein the 3D information hypotheses are potential 3D estimates, the positions being one of pixels of the current picture or groups of pixels of the current picture;
   calculating, for each position of the current picture of the first view, a similarity for each of the 3D information hypotheses of the respective position between a region of the current picture of the first view at the respective position and a corresponding region of a second view of the at least two different views located at a position displaced relative to the respective position by the respective 3D information hypothesis; and
   selecting, for each position of the first view, the 3D information hypothesis of highest similarity in order to acquire an updated depth/disparity map,
   wherein the determination of the 3D information hypotheses for each position of the positions of the current picture of the first view is performed on the basis of the pre-estimated depth/disparity map and independent from the 3D information hypothesis of highest similarity selected for any surrounding position of the positions of the current picture of the first view,
   wherein the pre-estimated depth/disparity map is obtained at a preceding iteration or at a preceding frame.

18. A non-transitory digital storage medium having a computer program stored thereon to perform the method for performing 3D estimation on the basis of pictures of at least two different views of the same scenery taken at different perspectives, the method comprising:
   determining 3D information hypotheses for each position of positions of a current picture of a first view on the basis of a pre-estimated depth/disparity map of the current picture of the first view, wherein the 3D information hypotheses are potential 3D estimates, the positions being one of pixels of the current picture or groups of pixels of the current picture;
   calculating, for each position of the current picture of the first view, a similarity for each of the 3D information hypotheses of the respective position between a region of the current picture of the first view at the respective position and a corresponding region of a second view of the at least two different views located at a position displaced relative to the respective position by the respective 3D information hypothesis; and
   selecting, for each position of the first view, the 3D information hypothesis of highest similarity in order to acquire an updated depth/disparity map,
   wherein the determination of the 3D information hypotheses for each position of the positions of the current picture of the first view is performed on the basis of the pre-estimated depth/disparity map and independent from the 3D information hypothesis of highest similarity selected for any surrounding position of the positions of the current picture of the first view,
   wherein the pre-estimated depth/disparity map is obtained at a preceding iteration or at a preceding frame,
   when said computer program is run by a computer.

* * * * *

UNITED STATES PATENT AND TRADEMARK OFFICE
CERTIFICATE OF CORRECTION

PATENT NO. : 11,170,202 B2
APPLICATION NO. : 16/206698
DATED : November 9, 2021
INVENTOR(S) : Wolfgang Waizenegger et al.

It is certified that error appears in the above-identified patent and that said Letters Patent is hereby corrected as shown below:

In the Claims

Please change the text at Column 37, Line 2, Claim 7, namely:
"… for a further position of the positions of the current picture of the first view different from the current positions using a further statistical measure different from the statistical measure."

To read:
-- for a further position of the positions of the current picture of the first view different from the current position using a further statistical measure different from the statistical measure. --

Please change the text at Column 39, Line 3, Claim 16, namely:
"… 16. The apparatus according to claim 1, wherein apparatus
     is configured to perform the 3D estimation iteratively with…."

To read:
-- 16. The apparatus according to claim 1, wherein the apparatus
     is configured to perform the 3D estimation iteratively with…. --

Signed and Sealed this
Seventeenth Day of May, 2022

Katherine Kelly Vidal
*Director of the United States Patent and Trademark Office*